United States Patent

Bharwani et al.

[15] 3,670,310

[45] June 13, 1972

[54] METHOD FOR INFORMATION STORAGE AND RETRIEVAL

[72] Inventors: Bansi U. Bharwani, Rochester, N.Y.; Harry Kaplowitz, Annadale, Va.

[73] Assignee: Infodata Systems Incorporated, Webster, N.Y.

[22] Filed: Sept. 16, 1970

[21] Appl. No.: 72,953

[52] U.S. Cl. ....................340/172.5

[51] Int. Cl. ....................G06f 7/10

[58] Field of Search ....................340/172.5; 235/157

[56] References Cited

UNITED STATES PATENTS

| | | | |
|---|---|---|---|
| 3,242,470 | 3/1966 | Hagelbarger et al. | 340/172.5 |
| 3,327,294 | 6/1967 | Furman et al. | 340/172.5 |
| 3,512,134 | 5/1970 | Packard | 340/172.5 |
| 3,408,631 | 10/1968 | Evans et al. | 340/172.5 |
| 3,593,309 | 7/1971 | Clark et al. | 340/172.5 |
| 3,448,436 | 6/1969 | Machol | 340/172.5 |
| 3,374,486 | 3/1968 | Wanner et al. | 340/172.5 |

*Primary Examiner*—Paul J. Henon

*Assistant Examiner*—Mark Edward Nusbaum

*Attorney*—Sughrue, Rothwell, Mion, Zinn & Macpeak

[57] ABSTRACT

A data storage and retrieval system based upon a three file concept is disclosed. The computer oriented system comprises at least an index, search, and data file. Access to the file structure is through the index file wherein a plurality of keywords are stored. Each keyword, either individually or in combination, is used to identify one or more data records stored in the data file. A plurality of paths through the search file, called chains, whose links comprise links addresses, provide a connection between the index and data files.

Keywords are automatically generated from field values contained in data records. Updating of these field values initiates the automatic updating of keywords in the index and search files.

In addition, to conserve file space, the allocation of space for keywords in the index file is made adjustable.

Provision is made for marking items as deleted and for bypassing deleted items during searching.

Provision is also made for the addition of a single item as a data record without using the loading procedure used to initially load the data base.

22 Claims, 21 Drawing Figures

FILE STRUCTURE

INVENTOR
BANSI U. BHARWANI
HARRY KAPLOWITZ

BY Sughrue, Rothwell, Mion, Zinn & Macpeak
ATTORNEYS

GENERALIZED FILE LOADING

DATA FILE LOADING

FIG. 5a

KD FILE FORMAT

| KEYWORD | SEARCH ADD. FOR ITEM FROM WHICH KEY EXTR. | DATA ADD. FOR ITEM FROM WHICH KEY EXTR. |
|---|---|---|
| A | 1 | 350 |
| C | 1 | 350 |
| C | 2 | 351 |
| A | 3 | 352 |
| B | 3 | 352 |
| D | 4 | 353 |
| A | 5 | 354 |

FIG. 5b

KD FILE FORMAT (SORTED ON KEYW. & SEARCH ADDRESS)

| KEYWORD | SEARCH ADD. FOR ITEM FROM WHICH KEY EXTR. | CORRESPONDING DATA FILE ADD. |
|---|---|---|
| A | 1 | 350 |
| A | 3 | 352 |
| A | 5 | 354 |
| B | 3 | 352 |
| C | 1 | 350 |
| C | 2 | 351 |
| D | 4 | 353 |

FIG. 5c

SR FILE FORMAT

| CODED KEY | SEARCH ADDRESS FOR ITEM | DATA ADDRESS | LINK ADDRESS |
|---|---|---|---|
| 1 | 1 | 350 | 0 |
| 1 | 3 | 352 | 1 |
| 1 | 5 | 354 | 3 |
| 2 | 3 | 352 | 0 |
| 3 | 1 | 350 | 0 |
| 3 | 2 | 351 | 1 |
| 4 | 4 | 353 | 0 |

FIG. 5d

SR FILE (SORTED ON SEARCH ADDRESS)

| CODED KEY | SEARCH ADDRESS | DATA ADDRESS | LINK ADDRESS |
|---|---|---|---|
| 1 | 1 | 350 | 0 |
| 3 | 1 | 350 | 0 |
| 3 | 2 | 351 | 1 |
| 1 | 3 | 352 | 1 |
| 2 | 3 | 352 | 0 |
| 4 | 4 | 353 | 0 |
| 1 | 5 | 354 | 3 |

FIG. 5e

RESULTANT INDEX RECORD

| KEYWORD | CODED KEYWORD | FREQUENCY | ADDRESS POINTER |
|---|---|---|---|
| A | 1 | 3 | 5 |
| B | 2 | 1 | 3 |
| C | 3 | 2 | 2 |
| D | 4 | 1 | 4 |

FIG. 8

EXAMPLE OF AN INDEX FILE CONTENT

| KEYWORD | CODED KEYWORD | ADDRESS POINTER | FREQUENCY COUNT |
|---|---|---|---|
| DESALINIZATION | 1 | 97 | 3 |
| DIARY | 2 | 42 | 92 |
| MAINE | 3 | 3 | 27 |
| NEW YORK STATE | 4 | 101 | 41 |
| OCEANOGRAPHIC | 5 | 100 | 5 |
| START = 1967 | 6 | 97 | 20 |
| START = 1968 | 7 | 60 | 40 |

FIG. 9

EXAMPLE OF A KEYWORD ARRAY

| KEYWORD | ARRAY ADDRESS | CODED KEYWORD | ADDRESS POINTER | FREQUENCY COUNT |
|---|---|---|---|---|
| OCEANOGRAPHIC | 1 | 5 | 100 | 5 |
| DESALINIZATION | 2 | 1 | 97 | 3 |
| START = 1967 | 3 | 6 | 97 | 20 |
| START = 1968 | 4 | 7 | 60 | 40 |
| NEW YORK STATE | 5 | 4 | 101 | 41 |

FIG. 10

EXAMPLE OF A TERM ARRAY

| ADDRESS IN KEYWORD ARRAY | | SUM OF FREQUENCY COUNT |
|---|---|---|
| START | END | |
| 1 | 2 | 8 |
| 3 | 4 | 60 |
| 5 | 5 | 41 |

COMPLETE PROCESS OF BLOCK 302, FIGURE 7

FIG. 12 FIELDS DEFINITION TABLE

| FIELD NAME | FIELD TYPE | FIELD LENGTH | INDICATION OF WHETHER FIELD KEYWORD | POSITION OF FIELD IN DATA RECORD |
|---|---|---|---|---|
| NAME | F | 30 | | 1 |
| DEGREE | F | 20 | P | 31 |
| JOB TITLE | V | MAX. LENGTH | K | 1 |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

ENTER KEYWORD IN ITEM

REMOVE KEY FROM ITEM

ADD PROCESS

COMMAND SYSTEM

METHOD FOR INFORMATION STORAGE AND RETRIEVAL

BACKGROUND OF THE INVENTION

1. Field of the Invention

The invention is in the field of computer controlled information storage and retrieval.

2. Description of the Prior Art

Information in the form of facts and figures is generally stored in a file. This file will be termed the "information or data" file. Often, the data file is indexed to enable retrieval of selected facts and figures without necessitating the reading of every fact and figure contained in the file.

The information stored in a data file is arranged in the form of facts and figures uniquely describing items of information, each item of information being referred to herein as a data item. The information stored in the data file may then be viewed as a plurality of data items. Each data item is further classified into identifiable sections, referred to herein as fields. The fields are identified by field names. For example, a data file may contain information on a particular company's personnel. Each data item may contain the separate fields which identify, respectively, the name of the employee, his age, his marital status, his college degrees, and salary. For each field there exists an information content, called the field value. Thus, for data items containing the fields of employee's name, age, and salary, the following field values may be stored in the data file:

John Jones; 32; $12,000.00

Of course, these field names and field values are just a few of an almost infinite class of field names and values. Files of patent lists, inventories, or the like, are well known and a variety of fields are used to described each of the data items contained in such files.

Various types of data may be required from a file. From a personnel file, a user may want to retrieve all the information contained therein on a particular employee, that is, he may want to retrieve the entire data item. On the other hand, he may wish to determine all of a corporation's employees who have a certain salary or those employees having a salary between a certain range of values. Thus, the problem is faced of how to retrieve these pieces of information in a most efficient way.

Generally, the basis for retrieval is a keyword or group of keywords. A keyword may be defined as a word which exemplifies the meaning or value of the information stored in the file. Thus, to find all employees who have attained a Bachelor of Science degree, the keyword B.S. may be developed to indicate all employees who have received a Bachelor of Science degree. A search of the file for B.S. will turn up the names of these employees. As is often the case, a single keyword is insufficient to describe the information sought to be retrieved. When this occurs, a plurality of keywords grouped in a specified logical combination may be used to identify the data items sought.

Files of the type just described may also require updating. For example, as employees enter and leave a company, their names and personnel records must be added and deleted to the file. As their salaries change, so must this entry in a personnel file. Fast accurate means must be developed to update these files.

The above description of information storage and retrieval and of data files applies to all data files whether generated, maintained and used totally by individuals, unaided by mechanized means, or computer generated and maintained.

In recent years, the advent of the computer has done much to increase the speed and efficiency of information storage and retrieval. The computer has bred large complex data files. At the same time, it has increased greatly the total number of users who generate and maintain such large complex files. As these files become more voluminous and as more people gain access to the computer storage and retrieval systems, it becomes important to develop high speed, easily maintained computer storage and retrieval systems which are readily adaptable to the numerous types of information which the modern world requires to be stored and retrieved.

One prior computer storage and retrieval system uses a system which is known as sequential searching. To retrieve data using this system, the computer is instructed to search each storage location until it finds the data item or items which correspond to the required information. Such a system has the obvious disadvantage of being time consuming.

It is obvious that the efficiency of the retrieval operation would be greatly increased if only those data items which contained the desired information were accessed and retrieved. A prior approach to the problem utilizes a search technique called the threaded list approach. Briefly, such an approach requires that there be included with each data item stored in a data file, an address of another data item stored in the file which is identified by the same keyword as this previous data item. This second data item will also contain a data file address. This address is the address of a third data item similarly identified by this same keyword. In this manner, every data item stored in the data file is linked within the data file to each other data item identified by a single keyword. The memory addresses stored with the data items are called link addresses and the combination of link addresses connecting all the items identified by a common keyword is called a chain.

All the keywords, which are contained in the data file, are stored in a table of contents. When retrieving information, a computer program causes the table of contents to be scanned, thereby determining if a particular word is present in a given data base, the data base being a group of data items in a data file. In addition to listing all the keywords contained in the data file, the table of contents also contains a frequency count of the number of times each keyword is found in the data file. In this way, the program can determine which of a group of keywords defining a data item or items to be retrieved occurs the least number of times, that is the keyword which has associated with it the smallest chain. Also associated with each keyword in the table of contents is a link address of one data item in the data file identified by the keyword. A search is now made of the data file, access thereto being made with the use of the link address associated with the keyword which has the smallest frequency count.

From a physical standpoint, such a system may be termed a "two-file system" since the keywords and for each, its frequency count, and the link address of a first data item containing that keyword, is filed in a first file while the data items and their link addresses in a second file.

In a second prior approach using the link address concept, a three file system is employed. The three files, which will be termed the index, search, and data files, each serve a unique function in the data storage and retrieval system.

The three file system, an outgrowth of the two file system, sought to solve problems encountered with the two file system. Briefly, the index file contains one keyword record for every keyword. Each keyword record contains the following: a keyword; a unique coded form of the keyword; a frequency count indicating the number of data records which are described at least partially by that keyword; and an address pointer to the search file. This address pointer points to an address in the search file which, among other information, contains the same coded keyword as is associated with the keyword record containing the address pointer.

The search file is a file containing one search record for every data record in the data base. Each search record describes a particular data record in terms of its keywords. Keywords are stored in coded form only in order to conserve storage space. Each record also contains, for each coded keyword, a pointer, called a link address, to an address in the search file of another search record which also contains that coded keyword. In addition, each record in the search file also contains the address in the data file of the actual data record identified by the search record. This file structure defines the relationship between any keyword and all the items indexed by it; and between a data record and all the keywords which are used to index it.

The data file is a file which contains one data record for every data item in the data base. Each record contains the complete item text, segmented into fields. Only the field values, not the field names, are stored within the data records. That is, each data item is defined in the data file by its field values.

One or more records may be combined into a block of records in a manner provided by the operating system as is well known in the art. In such a case a particular record would be identified by accessing the block and dividing it into the number of records contained therein. The method of retrieving a record in the block is an integral part of the operating system.

The three file system provides an advantage over the two file system in that the link addresses are removed from the data file and placed in the search file, thus providing greater data file space for storing data items.

However, the three file system does not make provision for varying the lengths of keywords to meet a variety of users needs. Since the maximum length of the keywords for different data bases vary, a system which provides a fixed keyword length for all data bases is wasteful.

Further, prior systems do not make provision for updating the data base by adding one or more data items directly into the data files without using the normal loading procedure. The normal loading procedure is used to load the index, search and data files when generating the data base. This loading procedure when used to update can be expensive and time consuming, for all the apparatus used in the loading procedure is required in the updating procedure. In addition, in that the loading system is required during an update procedure, direct or online additions to the data base such as from remote terminals is precluded. This problem becomes all the more acute with the three file system, for the addition of a data item usually requires modification of the three files.

Further, prior three file systems do not provide for the removing or bypassing during searching previously entered data items.

In prior system, keywords were entered into the file structure only from external means such as from cards in an input file. Since fields are often designated as keywords, when a field value which is a keyword is changed in a data record a new keyword would have to be entered into the system independently. Such a procedure is expensive and time consuming.

In prior systems, changes in field values or keywords could be specified directly by item or as a set of items which were retrieved by a given search. However the number of items which could be changed was limited, requiring the changes to be specified a number of times if many items were to be changed.

SUMMARY OF THE INVENTION

The present invention is an improved data storage and retrieval system based upon the three file concept disclosed. The system of this invention alleviates the problems encountered with the prior system by providing for an adjustable keyword length in the index file to conserve index file space, a means for marking data items as deleted and for bypassing these deleted items during searching, a unique means for updating the data base without using the loading procedure used to generate the initial data base in the system, while at the same time providing for a unique protection scheme to protect against the destruction of previously stored data items during the updating process. This allows for continuous searching even during the updating procedure.

To overcome the disadvantage of the prior systems associated with keyword maintenance the system of this invention provides for the automatic derivation of keywords from the field values in data items. Such a provision allows for keywords to be automatically entered into the index and search files as an item is entered into a data record. In this manner, if a data item is updated in the data file by changing a field value which is also a keyword, the keyword is automatically updated in the index and search files.

BRIEF DESCRIPTION OF THE DRAWINGS

FIGS. 5a–5e show the file formats used in loading the data, search and index files according to the teachings of this invention;

FIG. 8 is an example of the contents in an index file;

FIG. 9 is an example of a keyword array;

FIG. 10 is an example of a term array;

FIG. 12 is an illustration of a Fields Definition Table;

DESCRIPTION OF A PREFERRED EMBODIMENT

The preferred embodiment of the invention makes use of the IBM Operating System/360 using a 360 Model 40G or larger. However, the use of the OS/360 is not intended to be limiting, for the teachings of this invention are equally applicable to other computers and operating systems. When using the OS/360, the data base can be stored on any direct access device supported by the Operating System/360, and includes the IBM Disc Storage 2311 or 2314. In the description which follows, all programs are written in PL/1 language. Of course, it is obvious to those skilled in the art that the invention can be used with programs written in other programming languages.

Figure 1:
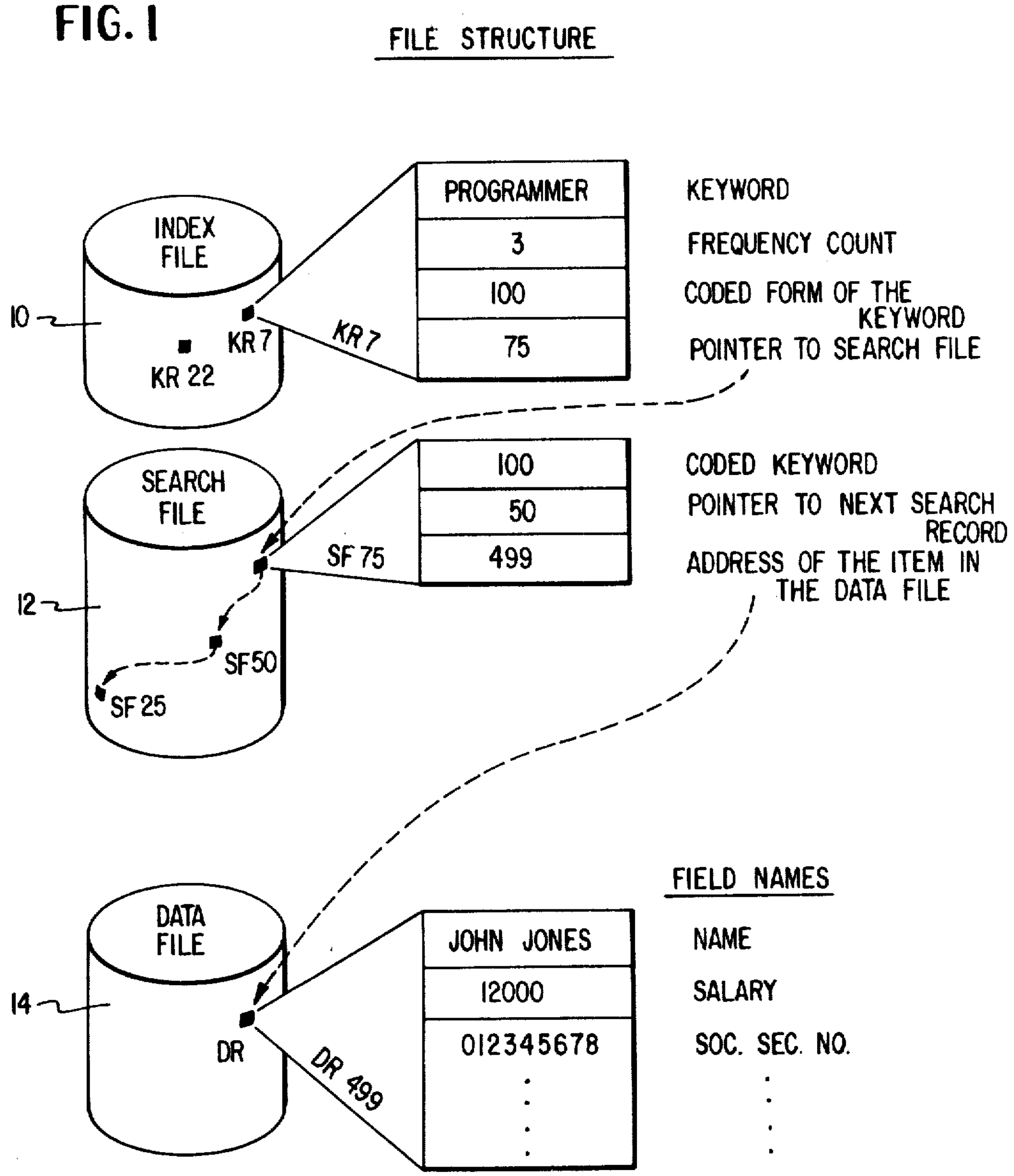
FIG. 1 is a diagram of the file structure of this invention.

With reference to FIG. 1, the index file 10 contains one keyword record for every keyword used to define data items in the data file. Each keyword record, KR, contains the following. The keyword, stored as the whole text of the word or phrase in alpha-numeric form, the keyword in coded form, a frequency count indicating the number of data items identified by that keyword and an address pointer to a first search file record which contains the coded form of the keyword. Thus, the index file comprises a plurality of these index records. The index file is organized such that the desired record may be read by specifying the keyword. In the case of the OS/360, such a file organization is known as indexed sequential organization. The method of loading the file is described in detail below.

In addition to the index records, the index file also contains an additional record which is called the trailer record. This trailer record contains the data base name, that is, it contains an identification of the search and data files whose items are described by the set of keywords contained in the index file. Additionally, the trailer record contains the next code to be assigned to the next keyword which may be added to the index file as the index is expanded.

The search file 12 contains a plurality of search records, one for each data item stored in the data file. Each record in the search file and its corresponding overflow records, if any, contain the total number of keywords associated with the data item, these keywords being stored in coded form as well as a link address, associated with each coded keyword in the search record, to access another search record which contains the same keyword. The overflow record is described below. In addition, each search record contains a count of the total number of keywords necessary to define this record including the number of keywords in an overflow record, if any, a flag which designates the item as active or deleted, as well as the address of the corresponding data item in the data file.

In addition to the above, when a search overflow file is used, each record also contains an address pointer to an overflow record contained in the overflow file. If there is no overflow record in an overflow file for a particular search record, a zero is stored in this location.

In addition to the plurality of search records, each search file contains another record which is called the search file header record. The search file header record contains the address of the last data item in the file. This address is contained in the search file so that when adding to the file the address for the next search record is available. In addition, the header record also contains the data base name so that the search file can be identified with the specific index, data and overflow files which will be used therewith.

The search overflow file is a direct access search file containing coded keywords and address pointers which cannot fit into the search file at a particular record location. The search overflow file is of the same organization as the search file except that overflow records exist only for items which need them. Additional overflow records may be used as the need arises. Each overflow record contains an address pointer back to the search file record to which it is associated. The overflow file also contains a header record which identifies the next available record in the file.

The data file is a direct access file containing a plurality of complete data items. The data items can take the form of pieces of literature, patents in a file of patents, people in a personnel file, etc. Each item is divided into fields which are the smallest named unit of data. Each data item is contained in a data record, thus, in the data file, there is a plurality of data records, one for each data item. In addition to the complete text of the data item, each data record also includes the address in the search file of the corresponding record as well as the length of this data file record. There is, in addition, contained in each data record, a table for varying length fields. Each entry in this table contains the offset and the length of the fields in the item. The offset is the bit position relative to the beginning of the record at which the field starts.

In addition to the data records, the data file contains two data file header records (DFHR). The first header record, DFHR1, contains the number of data items which are contained in the data file. It also contains the addresses in the data and search files which will be used to store the next data item entered into the system. DFHR1, in addition, contains the number of fields in a field definition table (which is the contents of header record 2), as well as the name of the data base and the number and sizes of each of the different field types. There are three different field types and they are fixed length, varying length, and numeric.

The fields definition table is contained in a second data file header record, DFHR2. This table lists each of the different fields contained in the data items stored in the data file. For each field there is contained, in the table, the field name, the field type, the field length or the maximum length if the field is a variable length field, an indication of whether the field is also a keyword, as well as the location of the field within each of the data records. Each data item is formed by first loading in the fixed length fields and then the variable length fields, a second variable length field being packed in next to the last bit in a first variable length field. As set forth above, in any record, access to a variable length field is by use of varying fields table. Determination of the beginning position in a record of any variable length field is by retrieving from the table the offset for the particular field.

A more complete understanding of the file structure may best be had by way of example. FIG. 1 illustrates the relationship between the three files and uses, as an example, a personnel file which includes information about one John Jones who is a programmer. As is seen, the index file contains as one of the keyword records stored therein, a record KR7 containing the keyword PROGRAMMER. Keyword record KR7 also contains the frequency count for the keyword PROGRAMMER, the coded form of the keyword, s well as an address pointer to an address location in the search file containing a search record which includes the keyword PROGRAMMER. Thus, the keyword PROGRAMMER which has been assigned the code 100, is associated with and identifies three data items. In addition, record KR7 indicates that search record SF 75 contains the keyword PROGRAMMER in its coded form.

The search file, as shown diagrammatically in FIG. 1, contains a plurality of records which, for purposes of illustration, includes records SF 25, SF 50 and SF 75 with the record SF 75 shown in exploded form. It is seen that, at the address location containing search record SF 75, there is contained the coded keyword 100 as well as a link address to another address record, in this case, record SF 50. As previously indicated, each search record contains coded keywords uniquely defining a data item as well as an address pointer indicating the address in the data file of the data item so defined. This is shown in FIG. 1 by address 499. The data file address 499 is a representation of an actual file address. Actual file addresses will vary depending on the physical file structure used. The search file address of 75, 50 and 25 indicate actual addresses in the search file relative to a zero storage location in the file. Thus, while conceptually there is a one to one correspondence between the data records and the search file records, physically the search file address and the data file address will not correspond. There is a one to one correspondence between the item number used to identify the data item and the search file address. The conversion of search file address to actual device address is performed by the operating system and is well known.

In that the record SF 50 is the next record in the search file to be accessed, as indicated by the link address in record SF 75, a search for all programmers employed by a company would continue in record SF 50 as indicated by the dotted lines in the representation of the search file. As in record SF 75, record SF 50 also contains a link address, this address being that of another search record in the search file which contains the coded keyword 100. In this case, it is record SF 25. After determining the address of the data item corresponding to record SF 50, in the search file, the search continues to the record SF 25. If record SF 25 is the last record in the search file which contains the coded keyword 100, then a flag in the form of a 0 is found in the search record location corresponding to the link address. In this manner, the search of search records containing the coded keyword 100 is ended.

Thus, when a keyword appears in a search request, the index file provides a direct entry into a first search record in the search file described by that keyword, bypassing all records which are not described by the keyword. The search file provides for linkage among all the search records which include a particular keyword, each record containing a pointer, in the form of a link address, to another record containing the same given coded keyword. Because the entire file is not processed for each request, that is, information retrieval is not done sequentially, search time does not grow linearly with file size. Since each record in the search file contains coded keyword information describing one and only one data item in the data file, more rapid searching is realized, while increasing total data file capacity for storing data items. Further the system provides for option of performing searches even when the data file is not directly available to the user. In that the data file contains only field values and does not contain keywords, the user may, at his discretion, supply any additional keywords which will, by his application, best describe the items and be helpful in retrieving these items. These externally supplied keywords do not have to be contained in the items themselves for they will be loaded only into the index and search files.

Figure 2:
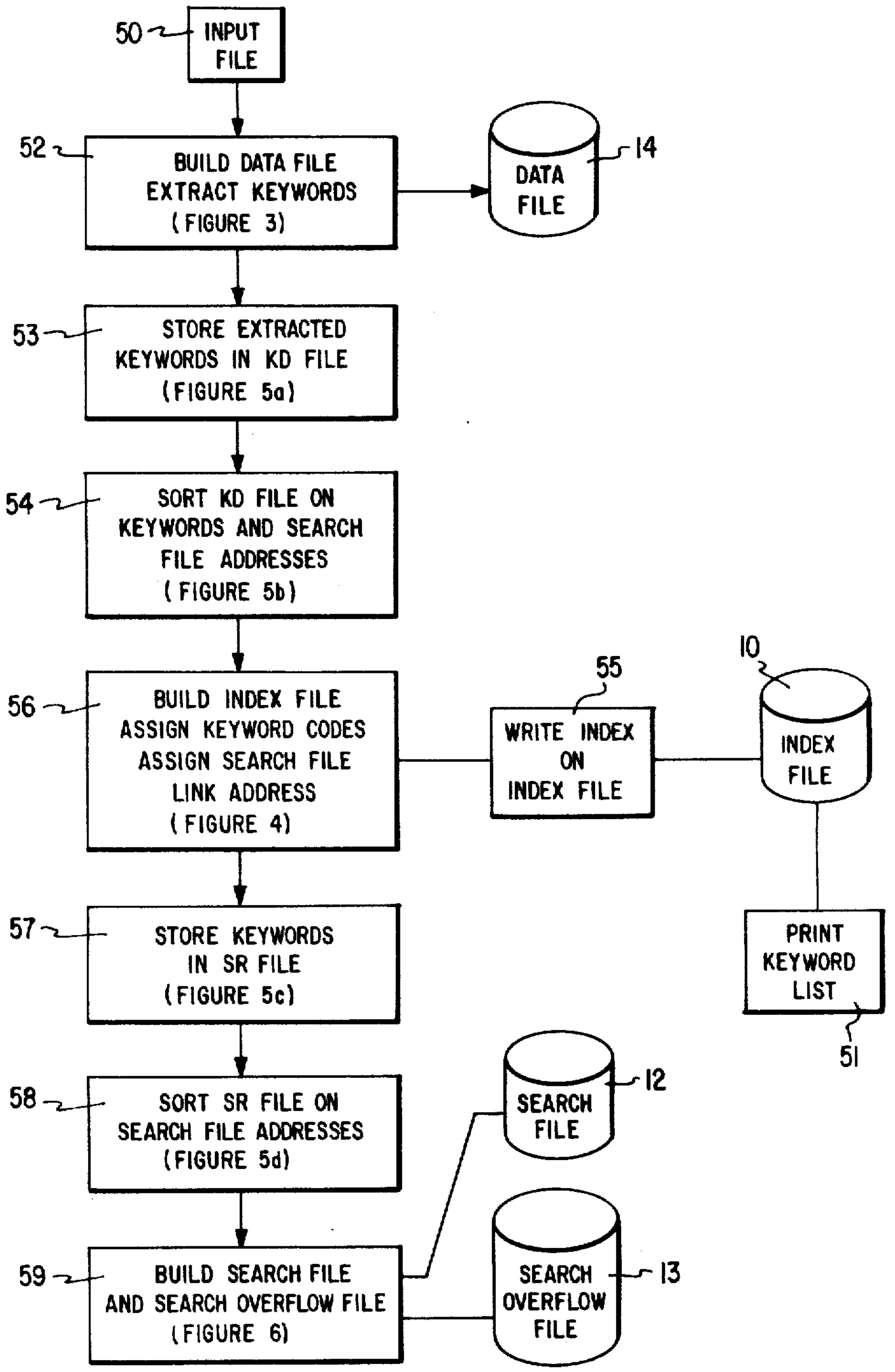
FIG. 2 is a generalized flow chart of the loading process used to carry out this invention.

With each of the files and its contents described, a method of loading the files which will allow for data retrieval using the method previously described will now be set forth. The loading of the files will be described with reference to the flow charts of FIGS. 2 through 6. FIG. 2 is a generalized flow chart for the loading of a three file data storage and retrieval system. The data file is loaded first. The data items are initially contained in a sequential input file 50 in the form of punch cards ready to be loaded into the data file. Each item may be contained on one or more cards. Prior to the construction of the data records in the data file, the DFHR2 is constructed. This header, as specified above, contains the field definition table. This table contains the field names of all the fields of the data items which will be loaded into the data file. For each field name, there is in the fields definition table the field type, length, whether the field value is to be a keyword and location of that field within the data items. This information is initially stored on punch cards. Under the command of a program, the system reads the cards and constructs DFHR2 in core storage.

Since for a particular data base the length of the keyword is fixed, the length of a keyword determines the size of the index file and the various temporary files (disclosed hereinafter) used during the loading process. The keyword length is selected by the user and may be made equal to the longest keyword in the data base.

As is known, job control cards are provided by the Operating System 360. Keyword length selection is accomplished by punching in the parameter field, KEY = number, on the job control cards for the operation of block 52. The number selected then dictates the keyword length. The keyword length is used in the formation of the index file as will be described. Other operations described hereinbelow also use the keyword length to calculate the storage space needed to carry out the respective operations. Once the keyword length has been entered into the system to form a basis for the allocation of index file space succeeding operations except the formation of the index file calculate the keyword length by subtracting from the index record length a set of constants comprising the lengths of the address pointer, coded keyword and frequency count. When a particular key word is of a length less than the allocated length, a program supplies blanks to fill in the unused space. The method for loading the keywords into the index file is disclosed below.

Figure 3:
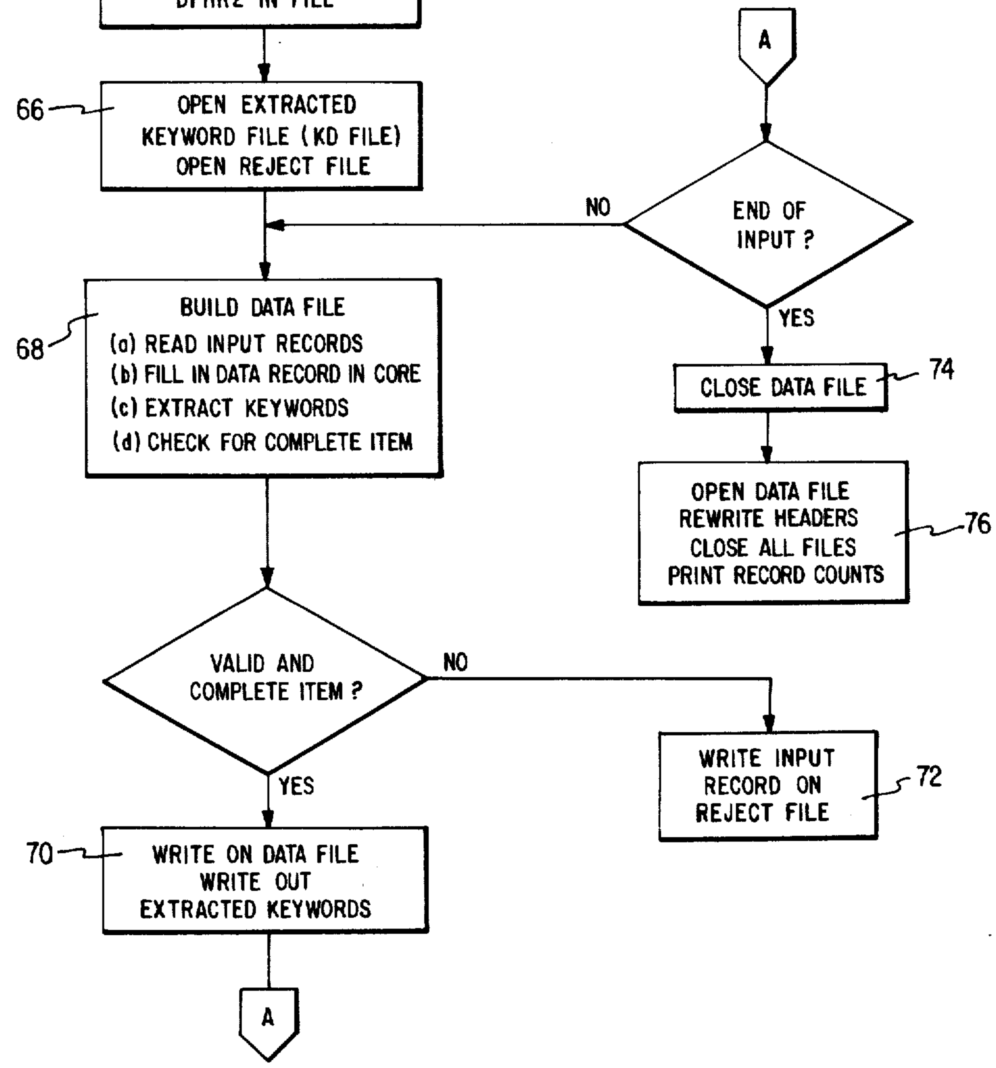
FIG. 3 is a flow chart for data file loading.

The details of the loading of the data file will be described with reference to FIG. 3. In a manner well known in the art, an initial instruction opens the system (block 60). The punch cards storing the field definitions are read and the field definition table constructed in core (block 62). An instruction now opens the data file and storage space in core for the data file record is allocated, based upon the total of the field lengths in DFHR2. Also during this time, DFHR1 is initialized in core to show an empty set of files and both DFHR1 and DFHR2 are initially written in the file. At this point, DFHR1 indicates that no items are stored and the next address is 1 (block 64). After the data file has been opened and the data record area allocated, an extracted keyword file in core storage is opened (block 66). This file, which will be called the KD file, contains keywords extracted from the input records as well as from the field definitions table. For each keyword, the file will also contain the search file address (assigned sequentially) and the data file address for the item containing the extracted keyword. Thus, every keyword in an item is assigned the same search file address.

The size of the KD file records is computed using the selected keyword length. The size of the KD records can be so computed since the length of the KD record is determined by the keyword length plus a fixed length determined by the space necessary to store the search and data file addresses. The KD file will be used to create the search and index files.

Keywords may be assigned externally in a manner known in the art. However, the system of this invention allows for the automatic derivation of keywords from field values in the data records. When assigned external to the system, the keywords are initially stored in the sequential input file 50 and entered into the system as keywords only. Thus, these keywords are not entered into the data file.

As previously described the fields definition table contains an indication of whether a field is a keyword. Such a designation takes form of the character P, the character K or a blank in a designated position in the fields definition table for each field name. FIG. 12 is an illustration of a fields definition table as used with the system of the invention. If a field is not to be made a keyword the specified location is filled in with a blank. If the character K is located in the specified location it is an indication that the field value in each data record is to be made a keyword. If the character P is located in the specified location, then the field value in each data record is to be made a keyword with the field name concatenated with an equal sign concatenated with the field value to form the keyword. Hence, such a keyword takes the form: the field name = the field value. With reference to FIG. 12 three field names are indicated, NAME, DEGREE and JOB TITLE. After each field name there is an indication as to whether the field is fixed (F), variable (V), or numeric (N), the field length if fixed, or the maximum length if the field is variable, an indication as to whether the field is to be a keyword as well as its location in the data record if it is fixed or its relative position to a variable length field if it is variable.

During the building of the data file (block 68) the keywords contained in the input records as well as those derived from fields are extracted and written into the KD file. When the data file and the KD file have been opened, a programmed instruction causes a set of input records to be read into core storage (block 68) and in a manner known in the art, checked for validity. Simultaneously, the keywords associated with the input record are extracted, stored in a temporary array in core storage. The extracted keywords are written on the KD file only after the item has been successfully added to the data file. If a valid record is detected, it is written into the data file (block 70). If a non-valid record is detected, then the program causes the record to be channeled to a reject file (block 72). During the course of loading, DFHR1 and DFHR2 are continually updated in core to show the present status of the data file in core. The loading process now continues by determining if additional data items are to be inserted into the file. If this is the case, then the next set of input records from the input file is read and, after checking for validity, written into the data file as previously described. Again, the keywords are extracted and if they are associated into valid data item written into the KD file. This process continues until the last record in the input file is written on the data file.

When the data record written into the data file is the last record in the input file, the system is so signaled by a flag, and the data file closed (block 74). The data file is then reopened and DFHR1 is replaced (rewritten) by the copy in core which contains the status of the completed data file (block 76). The necessity of first closing and then opening the data file before rewriting the header records is due to an OS/360 requirement and is not necessitated by the invention.

After each data record is constructed in core, the KD file is expanded by adding to it the keywords derived from fields. This is accomplished by scanning the fields definition table for the P or K characters. When either is found, the corresponding field value is extracted from the data record and written on the KD file. For example, on writing a data record containing an employee's name, his college degree and his job title, scanning of the fields definitions table indicates that the job title should be a keyword. Assuming that in this example the job title was FOREMAN, the field value FOREMAN is written on the KD file. It should be noted that the field value FOREMAN is not deleted from the data record. This process continues until all keyed fields have been examined.

After the data file has been created and the keywords extracted, they are sorted as indicated in FIG. 2 (block 54) on the keywords and search addresses in a manner well known by those skilled in the art and used to build the index and search files. Building of the index file, which is the next file built, is indicated generally at 56 of FIG. 2 and will be described with reference to FIG. 4.

An initial instruction opens the KD, SR and index files (block 100) and the first sorted extracted keyword record is read from the KD file (block 102). Allocation of the index file record space is accomplished as follows. The keyword length is computed by subtracting a fixed length, determined by the space necessary to store the search and data file addresses, from the record size of the KD file. The record size of the index file is then computed using the keyword length. The length of the index file record is determined by the keyword length plus the space necessary to store the coded form, the frequency count, and the address pointer. The operating system used in the preferred embodiment requires the index file keyword and record lengths to be also specified on job control cards when the index file is created. The program uses the computed lengths to allocate space in core for the records and to check the values specified on the job control cards. The SR file is discussed below. Next, a sequential code is assigned to the keyword (block 104). Each keyword stored in the KD file has stored therewith the search file and data file addresses of the data item which contained this keyword. Before creating the search file, the keywords are written on another temporary file which will be called the SR file. This file will contain, for each keyword transferred from the KD file, its code, the search and data addresses for the item identified by this keyword, and a link address. A keyword written in the SR file for the first time is given a link address of 0 (blocks 104 and 106). An index file record in core is initialized with the keyword, a frequency of 1 and an address pointer to the item written on the SR file.

At this point, the next record on the KD file is read (block 108) and scanned to determine if the keyword in this record is the same as that just written into the SR file. If it is, then as indicated at block 110, the keyword, in coded form, is, along with its search and data file addresses and link address, written into the SR file. The link address of this second keyword is set to the address of the previous item. Additionally, the frequency count for this keyword is increased and the pointer address in the index record in core is set to this item. If the next KD record read does not contain the same keyword, then the index record in core is written into the index file (block 114). Loading continues in this manner until all the keywords in the KD file are loaded into the index file.

Each time another KD record, containing the same keyword, is added to the system, the coded form of the word and its search and data file addresses are transferred into the SR file. The address pointer associated with that keyword in the index file is transferred to this item in the SR file and the address pointer which was assigned to the keyword in the index file inserted in the SR file, as the link address for the new SR record. When the last KD record has been read, an end of file instruction causes the last index record to be written. In addition, at this point, the trailer record which was described above is written into the index file and the file closed.

Figure 6:
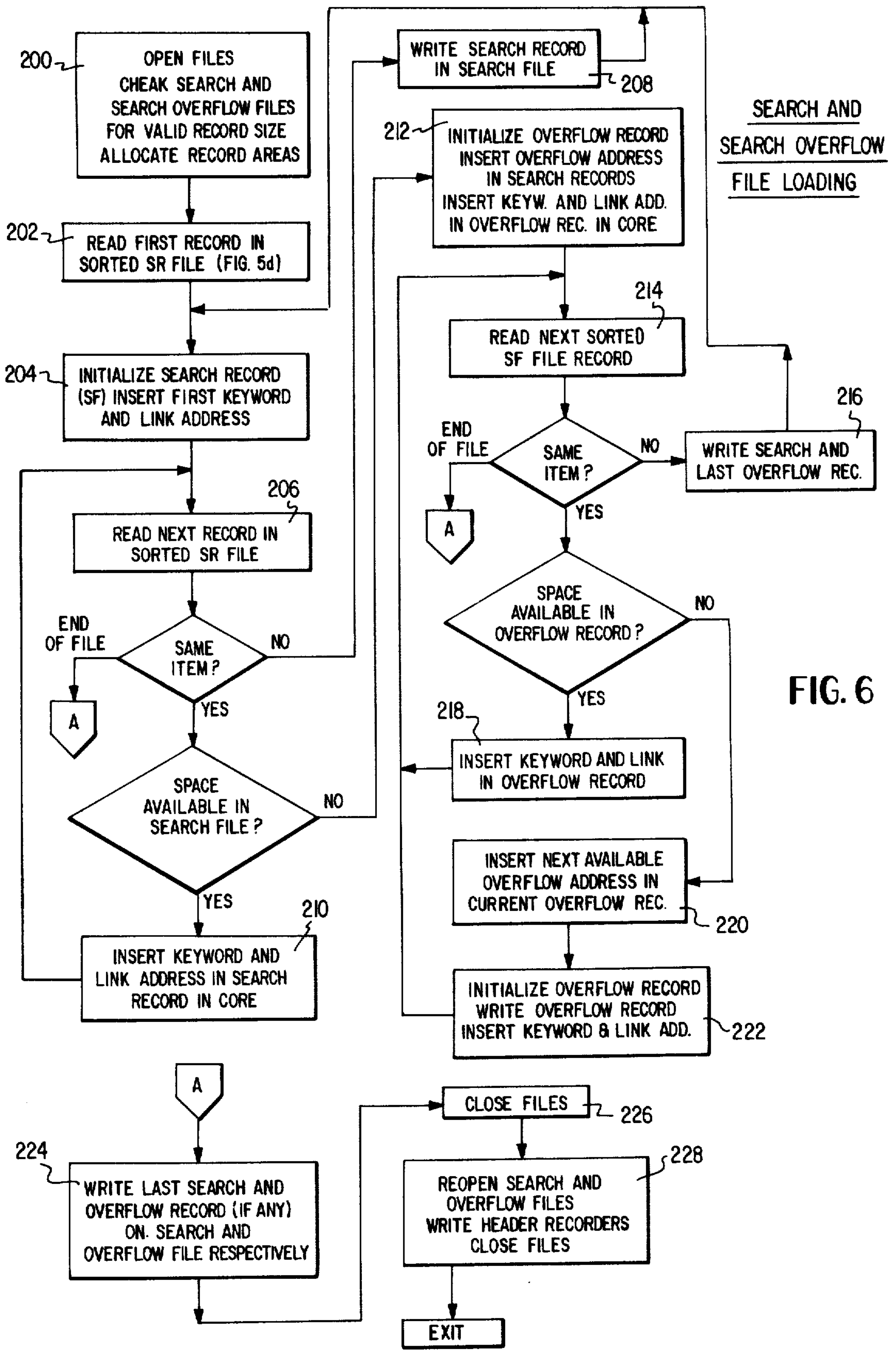
FIG. 6 is a flow chart for loading the search and search overflow files.

The loading of the search file will now be described. The SR file records are sorted on the sequentially assigned search addresses (block 58, FIG. 2). Again, such sorting is well known in the art. As shown in FIG. 6, to build the search file, an instruction opens the files (block 200) and the first sorted SR record read (block 202). The search record is then initialized in core and the first coded keyword and its link address inserted (block 204). The next sorted SR record is read (block 206) and it is determined if the item identified by this second record is the same as the item identified by the search record being constructed. If it is, the search record in core is scanned to determine if there is space to accept another keyword. If there is, then this keyword (in its coded form) and its link address is inserted into the search record (block 210) in core. If no space is available, then an overflow file address is assigned and placed in this search record and the coded keyword and its link address inserted in the address of the overflow record (block 212). This procedure is continued as indicated in FIG. 6 until all the keywords associated with an item have been inserted into the search and overflow record. If the overflow record is full, then, as indicated (blocks 220 and 222), an additional overflow address is assigned.

When the next SR record read is not associated with the same item as the previous record, then a program instruction orders the search record associated with the previous item written on the search and overflow file (if the overflow file has been used) and the search record and core initialized with a new item and the coded keyword and link just read is inserted in core. If the next SR record is associated with the same item as the last one, the procedure previously outlined is followed.

When the last record in the SR file is reached, the program indicates an end of file. This causes the last search record and overflow, if any, in core to be written into the search and overflow files. The search file is then closed and reopened. The search file header record is updated to show the file status and written on the search file. The overflow file header is similarly written. The closing and reopening of the search and overflow files before updating the header record is again a requirement of the operating system and is well known.

FIG. 5*a* is an example of a KD file developed as described above from the data in the input file. The file contains seven records, each record containing a keyword, the search file address of the item from which the keyword was extracted, the data file address for the item as well as the card sequence of the input record from which the keyword was derived.

Consider the first item read. This item is defined by keywords A and C. Since this is the first item to be read into the data file, a search address of 1 is assigned to it. The data address is indicated arbitrarily as 350 to indicate that the data file address, which will store this first item is not necessarily the beginning of a file. The second item read, defined by the keyword C, is assigned search address 2. The search addresses are assigned sequentially until all items are read into the data file.

At this point, as explained previously, the KD file is sorted on the keywords and search addresses. The resulting file is indicated at FIG. 5*b*.

From the KD file is formed the SR file which, as previously described, contains the keywords which were in the KD file in coded form, the codes being assigned sequentially. For each coded keyword, the SR file contains the search file address of the item from which the keyword was extracted as well as the data file address for the item and the link address. The first time a keyword appears in the SR file, a link address of 0 is assigned to it. Each subsequent time the same keyword is entered into the file, its link address becomes the address of the previous item with this keyword. Thus, a link address of 0 indicates that this item is at the end of a list of records containing the keyword.

With reference to FIG. 5*c*, the first time coded keyword 1 enters the SR file, it is assigned a link address of 0. If the next coded keyword to enter the file is also a 1, then a link address of 1 is assigned to this next keyword. Link addresses will be assigned pointing to the previous search file address until all keywords represented by code 1 are in the SR file. When a new keyword, represented by coded keyword 2, in FIG. 5*c*, enters the SR file, a link address of 0 is assigned to this keyword. The method of assigning the link address now becomes apparent. Link addresses are assigned to the other keywords in the above described manner, thereby developing the SR file illustrated in FIG. 5*c*.

Figure 4:
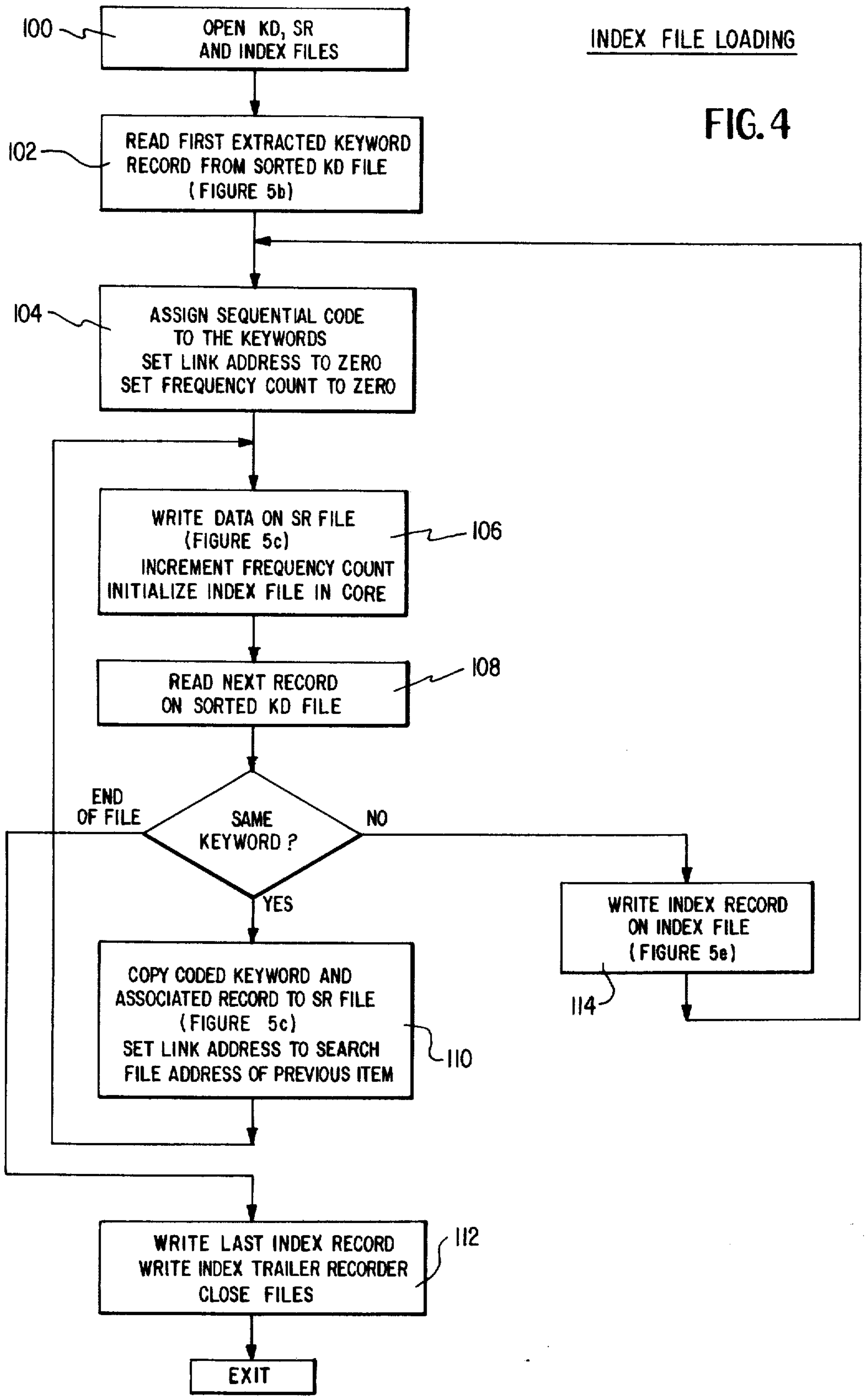
FIG. 4 is a flow chart for index file loading.

The index records are derived from the sorted KD file. FIG. 5*e* illustrates the resultant index record developed from the file represented in FIG. 5*b*, and the link addresses as assigned in core (FIG. 4, block 110). The address pointer is the search file address of the last entered search record containing a particular keyword. Thus, for keyword A, the last entered item containing this keyword A has been assigned to search file address 5. Therefore, the address pointer in the index file for keyword A is to search address 5 in the search file. The keyword codes are assigned to keywords sequentially as they are entered into the index file.

It is obvious that the loading procedure described above can also be used for updating the file by adding new items. When such is the case, header records are read from the files rather than initialized in core so that each program knows the next available locations in the files. In addition, the building of the index file is modified as follows. Whenever a new keyword is read from the SR file (block 102), a comparison is made with the previous index file. If the keyword is present in the previous index file then block 104 is changed to read the record from the index file. If the keyword read from the SR file is higher in the sorting sequence than the next record to be read from the index file then all lower keywords are copied to the new index unchanged. If the keyword is lower than the next keyword in the index file then it is a new keyword and block 104 is executed as shown in FIG. 4.

Figure 14:
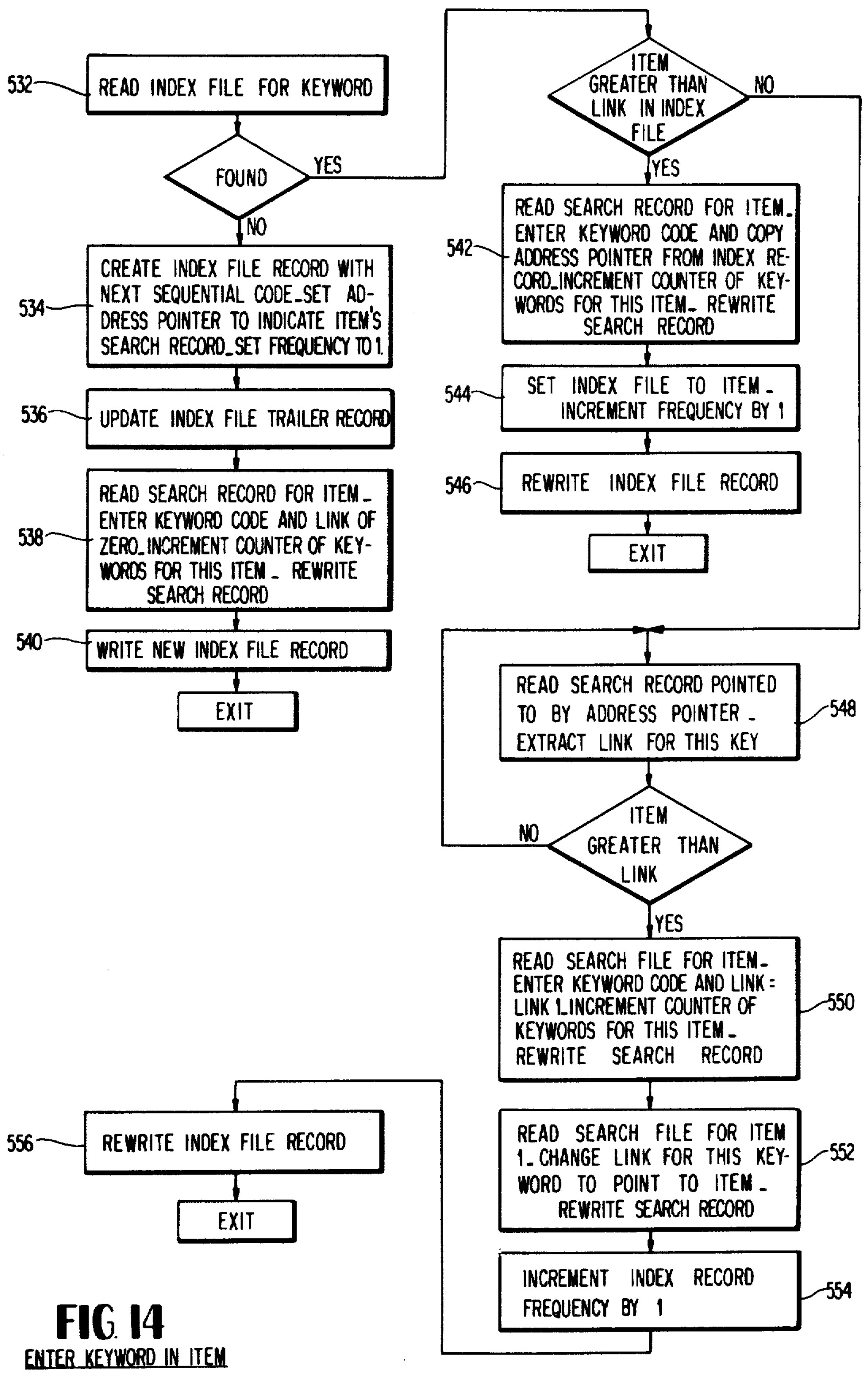
FIG. 14 is a flow chart for entering a keyword in a data item.
Figure 15:
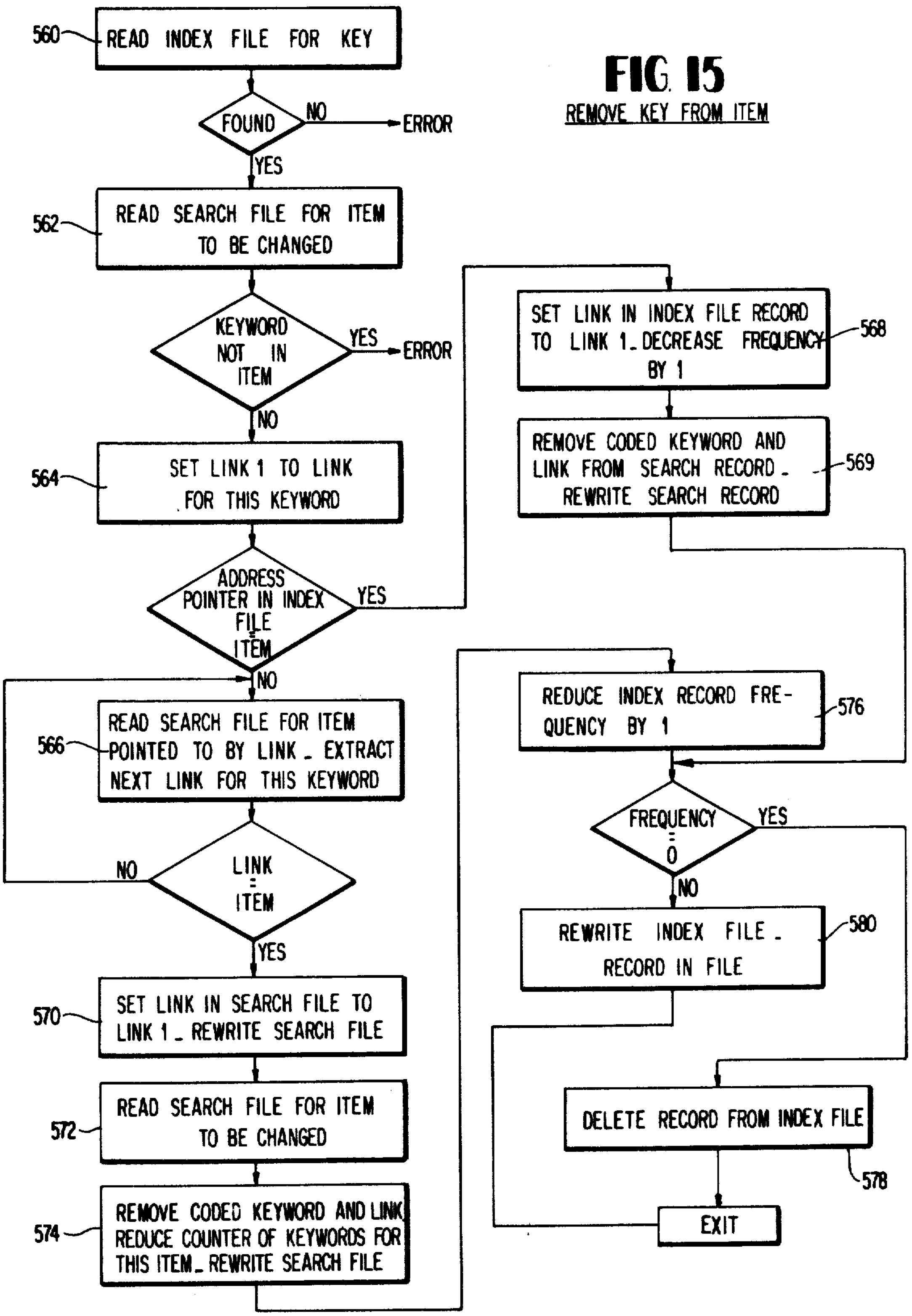
FIG. 15 is a flow chart for removing a keyword from a data item.

The provision for automatic derivation of keywords from field values in the data records allows for automatic keyword maintenance. The method for automatic keyword maintenance will now be described. It should be noted that the method described applies only to those keywords generated internally and not to externally generated keywords. However, as will become apparent the procedures for entering and removing keywords as illustrated in FIGS. 14 and 15 are applicable to changing externally generated keywords.

The method to be disclosed causes any keyword which is derived from a field value to be changed whenever the field value changes. For example, let it be assumed that the field value associated with the field name JOB TITLE is a keyword. For the purposes of explanation let it be also assumed that an employee has been promoted from an engineer to a supervisor. Therefore, his personnel record must be up-dated to so indicate the new job title. In addition, the index, search and data files must all be changed to reflect this promotion. In short, the field value and the old keyword "ENGINEER" must be deleted from the data record associated with this employee as well as from the associated search record. In addition, in the index record containing keyword "ENGINEER," the frequency count must be reduced and the address pointer updated. Further, the keyword, field value SUPERVISOR must be inserted in the data record associated with the employee and the associated search record must be up-dated to include this new keyword in coded form. Further, a proper link address must be added to the search records for the new keyword and the index record associated with the keyword SUPERVISOR up-dated to reflect the change.

Figure 13:
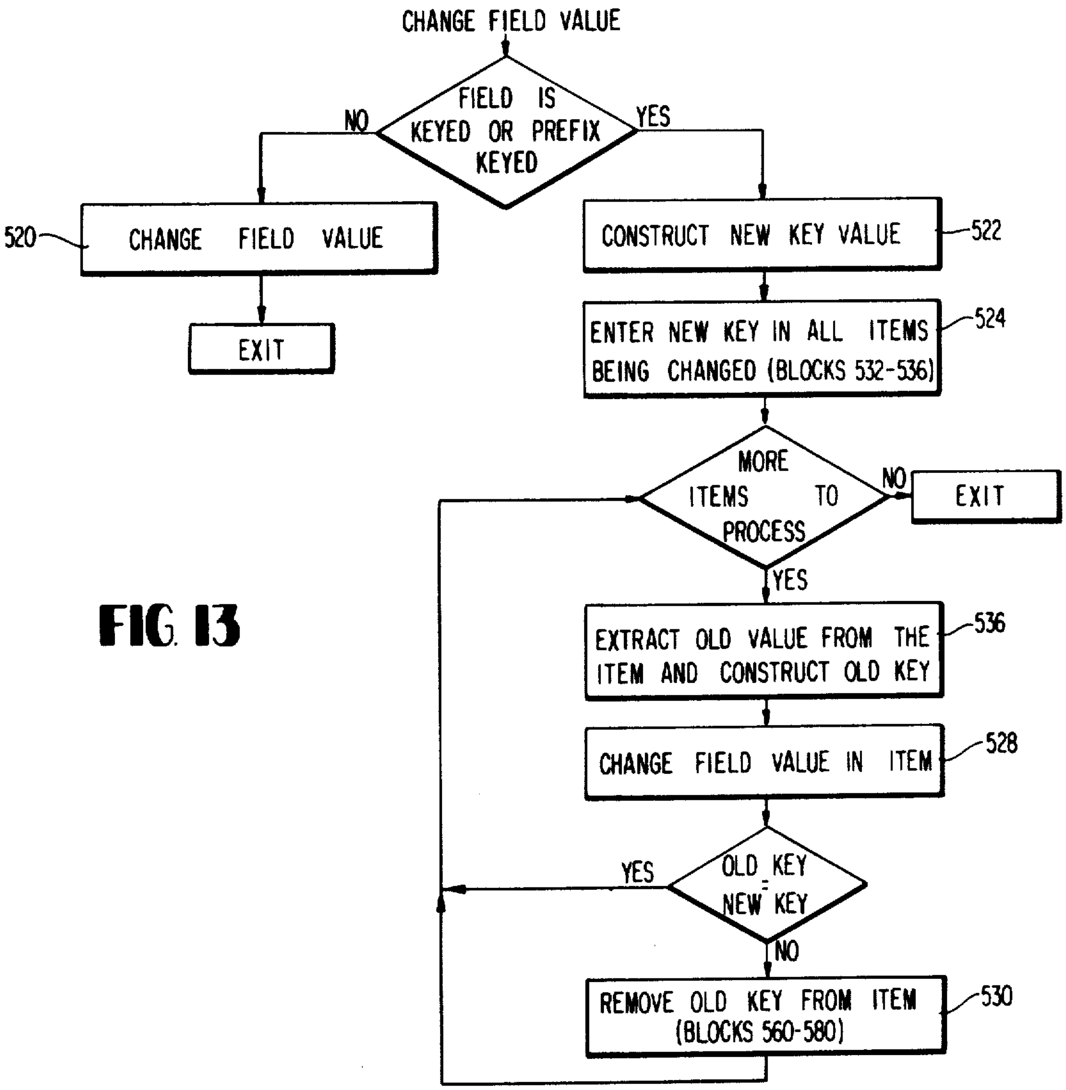
FIG. 13 is a generalized flow chart for changing a keyword if it is also a field value.

FIG. 13 is a flow chart of the generalized procedure for changing the keyword if it is also a field value. FIGS. 14 and 15 are detailed flow charts of portions of FIG. 13. BLock 524 is detailed in FIG. 14 while block 530 in FIG. 15.

The procedure of FIG. 13 changes fields and keywords for one or more items. These items identified by item numbers may be supplied externally or may be obtained by searching the files as disclosed below. In either case, the list of item numbers is stored in core array. If the number of items exceeds the available space in the array then the procedure of FIG. 13 is executed for all items in the array and more item numbers are obtained. A method for interrupting and resuming searching will be disclosed hereinbelow.

The method of entering the new keyword into the search file and the method for up-dating the index file to reflect the entrance of the new keyword will be described with reference to FIG. 14. When the new field value is entered into the data record and it has been determined by scanning of the fields definition table that this new field value is a keyword the operating system is instructed to read the index file for the new keyword (block 532). Two situations are now possible. The first occurs when the keyword is already in the index file while the second when it is not. When the keyword is not yet in the index file a new index record must be created. The operating system is instructed to read into core the trailer record (previously disclosed) which contains the next sequential code to be assigned to the next keyword to be added into the index file. The index file record is constructed in core by entering the keyword along with the next available sequential code determined from the trailer record, an address pointer set to the search file address of the data item being modified and a frequency count set to 1 (block 534). The index file trailer record is then up-dated by incrementing the sequential code by 1 and rewritten to the index file (block 534). The search record corresponding to the data item being up-dated is read to core and the coded form of the new keyword and a link of zero inserted in the proper location within the record (block 538). If no room is available, then the overflow file previously described is used. The overflow record in the overflow file corresponding to the search record accessed is read and the keyword with a link address of zero entered therein. The count of keywords in the search record is incremented by 1 to reflect the addition of the keyword. The search record and the overflow record if used are now rewritten into the search file and overflow files respectively (block 538). The O.S. is then instructed to enter the new record in the index file.

Let it now be assumed that the added keyword is already entered into the index file. For example, referring to the up-dating of the employee's job title from ENGINEER to SUPERVISOR if the company already has other supervisors the keyword SUPERVISOR will already be in the index file. In such a case, the search record corresponding to the data record being up-dated must be fit into the chain associated with the keyword SUPERVISOR without disrupting the search system. The method for accomplishing this will now be described.

Let it first be assumed that the search record to be modified has a higher address in the search file than the address pointer associated with the keyword SUPERVISOR. In such a case this search record will now become the first record in the chain. In the manner previously described the search record to be up-dated is initially read into core and the coded form of the keyword entered into the search record. In addition, the address pointer determined from the index record is entered in the search record. The count of keywords associated with this search record is incremented by 1 and the search record rewritten into the search file (block 542). To up-date the index record associated with the keyword SUPERVISOR, the frequency count is incremented by 1 and the address pointer set to indicate the address of the up-dated search record (block 544). The index record is now rewritten into the index file (block 546).

Where the search record address is less than the address pointer associated with the keyword being added, additional steps must be taken to make sure that the search record is in its proper position in the chain. To accomplish this, the search record pointed to by the address pointer in the index record is read and the link address corresponding to the keyword SUPERVISOR extracted (block 548). This link address is compared with the link address of the search record to which the keyword is to be added and it is determined whether or not the search record address is greater than the link address. If it is not, then the search record indicated by the link address is read and its corresponding link address is extracted and compared with the address of the search record to which the keyword is to be added. If the address of the search record is greater than the link address, then the position in the chain for the search record has been determined. For the purposes of explanation, let the extracted link which is smaller than the search file address of the search record to be modified called the LINK 1, while the item from which this LINK 1 link address has been extracted called the ITEM 1. When the position of the search record has been determined, it is read from the search file and the coded form of the keyword SUPER- VISOR entered therein, and the link address equal to LINK 1 entered. As previously explained, the count of the keywords is incremented by 1 and then the up-dated search record rewritten into the search file (block 550). The link address in ITEM 1 must now be up-dated to reflect the change in the chain. To do this, the search record corresponding to ITEM 1 is read out into core and the link address corresponding to the LINK 1 deleted and replaced by the address corresponding to the search record modified by the addition of the keyword SUPERVISOR (block 552). The ITEM 1 search record is now rewritten into the file. To up-date the index record corresponding to the keyword SUPERVISOR the frequency count is incremented by 1 (block 554) and the index record rewritten into the index file (block 556).

The keyword ENGINEER must now be deleted not only from the data file, but also from the search record associated with the data record being up-dated. The removal technique will be described with reference to FIG. 15. When the system is instructed to remove the field value and replace it by another field value, assuming the field value to be a keyword, the operating system is instructed to read the index file for the keyword being removed (block 560).

When the keyword is found the search file record corresponding to the item being up-dated (block 562) is read. The search record and the index record are written in core so that they can be modified. To protect the operability of the system during the keyword removal process the search record to be modified must be by-passed before the keyword is removed. This will allow continued use of the system while the search record is being modified. This is accomplished in the following manner.

After the search record has been located, the link address associated with the keyword to be removed is extracted and stored in core, (block 564). The extracted link address is denoted in FIG. 15 as LINK 1. The address pointer located in the keyword record is compared with LINK 1. If they are the same, it is an indication that the search record which is to be modified corresponds to the first record in the chain associated with the keyword. When this occurs the address pointer in the index record is changed to indicate the LINK 1 address. In this manner, the search record to be modified is by-passed by the chain associated with the keyword ENGINEER. In addition, if the frequency count is zero indicating that there are no other search records containing the keyword ENGINEER, the operating system is instructed to delete this index record. If the frequency is other than zero, the up-dated index record is rewritten in the index file (block 568). The coded keyword and its associated link is then removed from the search record and the search record rewritten in the search file.

If, however, the address pointer does not point to the search record being operated upon, additional steps must be taken to by-pass this search record prior to the deletion process. To accomplish this, the search record pointed to by the address pointer associated with the keyword to be deleted is scanned and the link address in this first search record extracted into core and compared with the address of the search record which is to be modified (block 566). If they are not equal the link address extracted is used to access another search record and this is scanned for the link address associated with the keyword to be deleted from the specified search record and extracted (block 566). Again, the extracted link address is compared with the address of the search record of interest. This process continues until the extracted link address equals the address of the search record to be modified, indicating that this record immediately preceeds the search record of interest in the chain.

When the proper link address is found its associated search record is read into core and there the link address associated with the keyword to be removed is deleted and replaced by the LINK 1 address. This search record is now rewritten into the search file (block 570). In this manner, the chain associated with the keyword ENGINEER is complete with the search record of interest being by-passed. The search file is now read for the search record to be changed (block 572). The coded form of the keyword ENGINEER and its link address, that is the LINK 1 address is deleted from the search record and the count of keywords reduced. The up-dated search record is rewritten into the search file (block 574).

The index record associated with the keyword ENGINEER must now be up-dated to reflect the changes. To do this the frequency count is reduced by one (block 576) and if it is found to be zero, the index record is deleted from the index file (block 578). If it is other than zero, the index record is rewritten into the index file (block 580).

In order to up-date the data base by adding one or more items directly into the files without using the previously described loading system, the following described single item load method is included with the system. This singe item load method avoids the overhead of the loading process and also permits direct or on-line additions to the files from remote terminals. The block designations used in describing the procedure refers to the flow chart of FIG. 16. In brief, the single item load procedure builds a data item using the same logic as was used in the loading process as set forth in block 68 of FIG. 3 with the following exception. The extracted keywords are stored in a core array rather than written to the KD file. This permits inputs of a single item either from cards or from a remote terminal.

Figure 16:
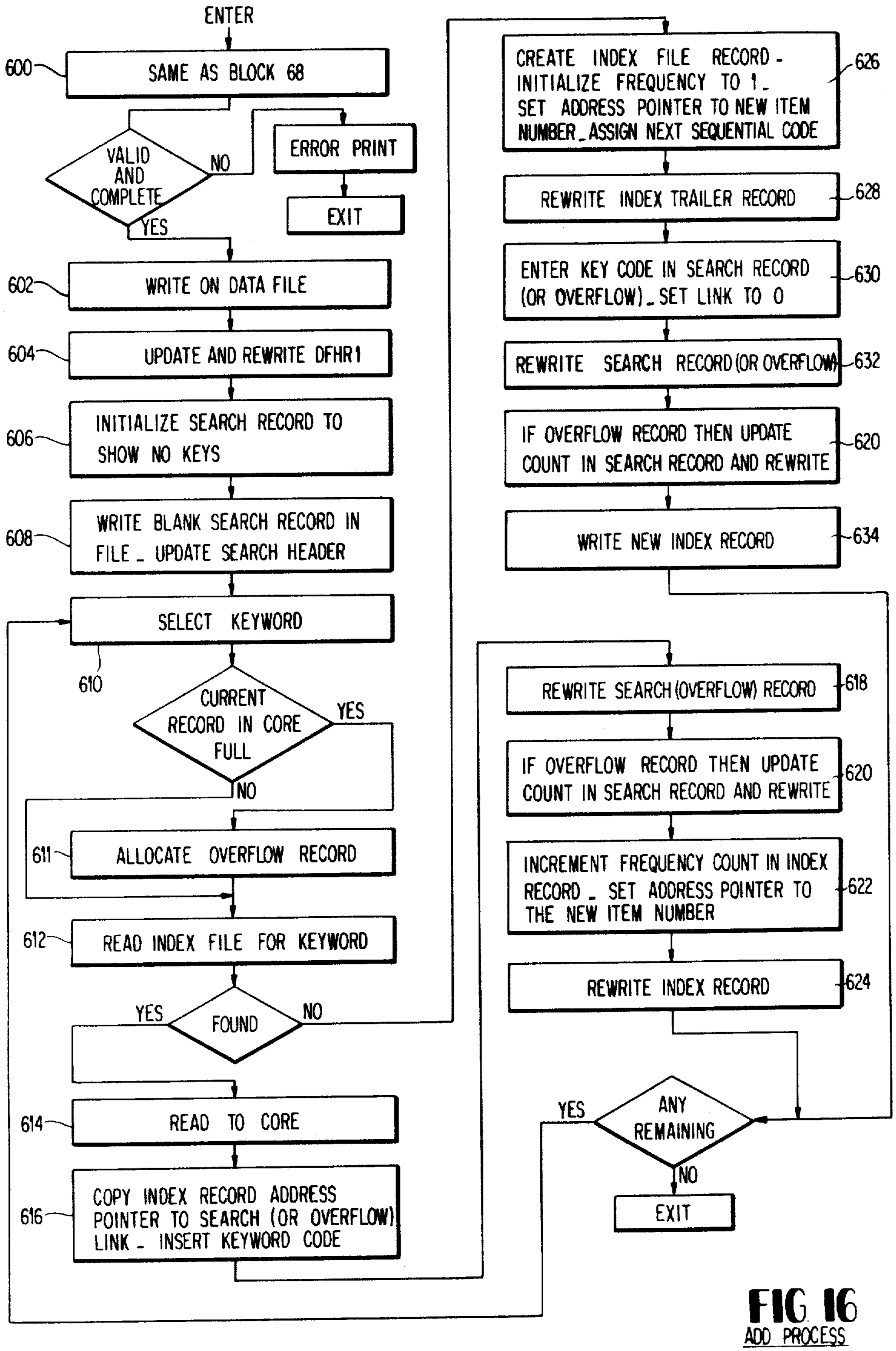
FIG. 16 is a flow chart for adding a single data item to the data file.

The single item add procedure will now be described with reference to FIG. 16. Initially, a new item is constructed as previously described with reference to FIG. 3 block 68 (block 600). If a valid item is entered, it is written on the data file (block 602) and the DFHR1 updated as previously explained (block 604).

To develop the index and search records associated with the added item a search record is initialized in core to show no keys (block 606) and a blank search record written on the search file. In addition the search header record is updated to reflect the addition search record being added (block 608).

A first keyword associated with the new item is selected from the array in core and the search record in core is examined to determine if space is available for this keyword. Assuming space does exist the index file is read to determine if the keyword has been previously used in the data base (block 612). Assuming that it has, the selected index record is read to core and the address pointer and coded keyword copied to search record and the search record rewritten in the search file to reflect the keyword, its coded form and its link address (block 616).

If space was unavailable in the search record in core an overflow record from the overflow file would be allocated for this search record (block 611). The method of allocation has been previously described. The keyword, its coded form and its link address would then be stored in the overflow file. The overflow record is then rewritten in the overflow file. The search record is updated to indicate the overflow record and rewritten into the search file (block 620).

The index record in core must now be up-dated to indicate a new address pointer and incremented frequency count. This is accomplished by incrementing the frequency count by one and setting the address pointer to the address of the added search record (block 622). The operation just described was described as occurring in a specified order. This order is important for by so carrying out the operations the chains in the system are not broken until the new search record has been added to the search file. This assures continued operation of the system even if a failure occurs in the adding process.

Let it now be assumed that the keyword being entered has not previously been entered into the index file. Therefore, the creation of a new index record is necessitated. To accomplish this the operating system is instructed to create a new index record in core. The keyword is written into core and the index file trailer record read to determine the next sequential code. This code is assigned to the index record being created. In addition, a frequency count of 1, and an address pointer indicating the search file address of the new stem is added to the index record (block 626). The index file trailer record is rewritten indicating the next sequential code to be assigned the next index record to be added (block 628). The keyword, its coded form and a link address of 0 is now written into the search record (or overflow record) in core (block 630). The search and overflow record (if used) is now written into the search or overflow file (block 632). Again, if an overflow record was used the search record is updated as previously explained. When this has been accomplished the new index record is written into the index file (block 634). Again the order in which the above was described is important.

The core array of keywords is now scanned to determine if any additional keywords remain. If more remain the above procedure is followed for each keyword until no keywords remain.

The data item deletion procedure will now be described. An item is deleted by reading the search file record corresponding to that item into core, setting a delete flag in the search file record to mark the item as deleted. The search record is then rewritten onto the search file. In this way the data item, corresponding to the marked search record, is marked so that it will be bypassed during searching. By so marking the search records, an item can be effectively deleted from a search without changing the chains associated with all keywords for that item.

The data, search and index files are now loaded and the system is ready for retrieval operations. The method of data retrieval has been disclosed broadly above. A detailed description of the search and retrieval method which utilizes the three-file system of this invention may best be had by way of an example. Let it be assumed that the data base contains an investment analysis file containing information about publicly owned corporations. Each data item is a record of one company and contains fields such as company, revenue, start (i.e., the year the company was formed), the number of shares, etc. It will further be assumed that the year of formation has been designated a keyword in the form START = 1968 and external keywords describe market areas or technologies in which the firm is engaged. If a user wants to find information about relatively new, independent companies in the oceanographic or related fields located in New York State for potential speculation purposes, the following search description may be entered into the computer: FIND OCEANOGRAPHIC OR DESALINIZATION AND START = 1967 or START = 1968 and NEW YORK STATE. This description describes companies involved in the areas of either oceanographic or desalinization or both. However, companies, in order to fit the total description, must also have been formed in either 1967 or 1968 and be located in New York State. This search description contains the command word FIND and keywords OCEANOGRAPHIC, DESALINIZATION, START = 1967, START = 1968, and NEW YORK STATE. A program, on the command of the command word FIND complies and optimizes the keyword portion of the query as will be described with reference to FIGS. 7–11.

Figure 7:
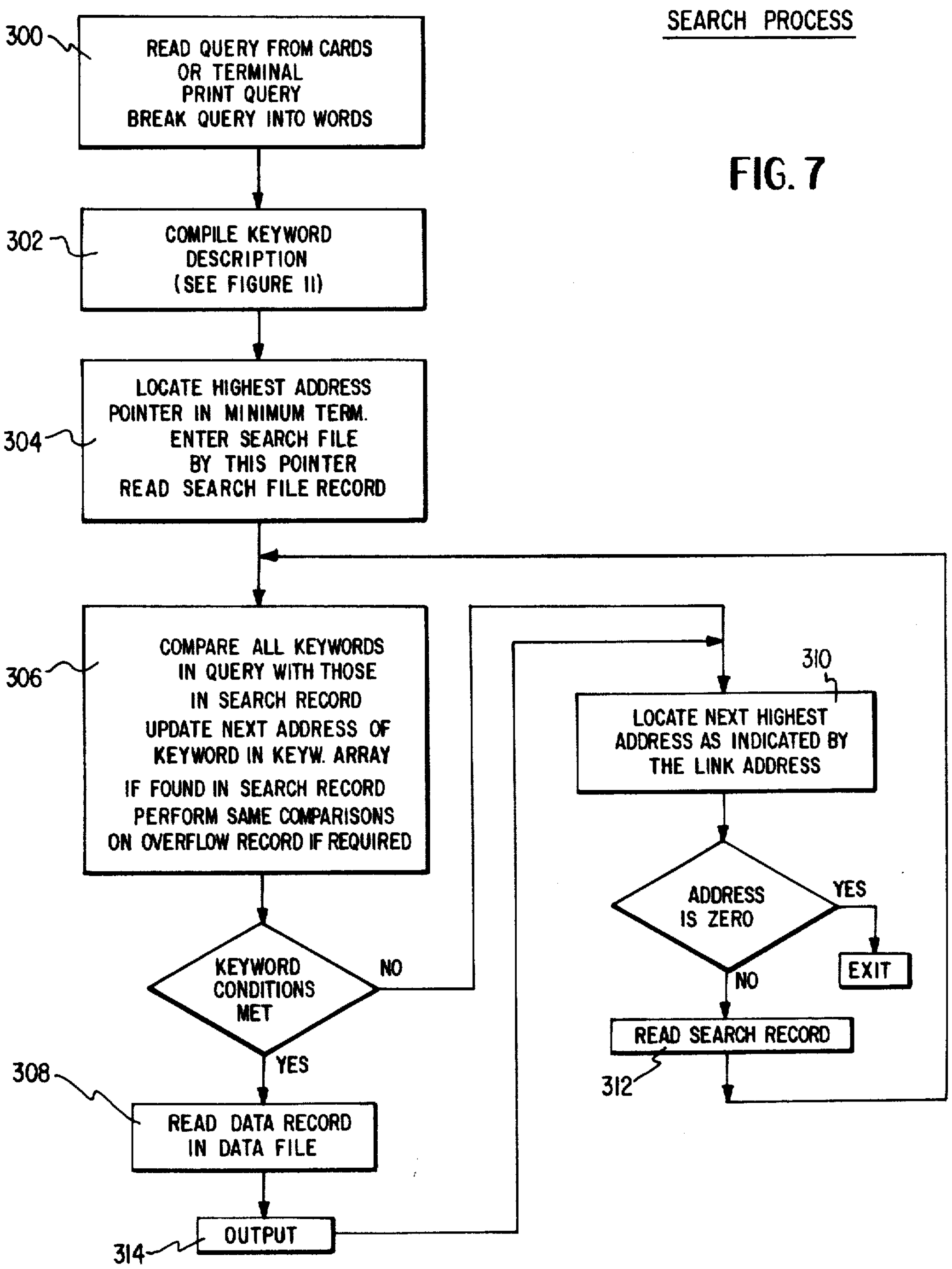
FIG. 7 is a flow chart of the search process using the teachings of this invention.

FIG. 7 is a flow diagram for carrying out a search and retrieval using the invention. Initially, the query is read into the system, printed and broken into words (block 300). The keywords are then compiled (block 302) into keyword and term arrays. Examples of the keyword and term arrays, as applied to the example given above, are indicated in FIGS. 9 and 10, respectively. The keyword array is developed from information in the index file. An example of the contents of an index file which may be used with the example given is shown in FIG. 8. Of course, it is understood that the contents of an actual file would exceed the contents of the file shown in FIG. 8 many times. The term array is derived from the keyword array. Each term is defined as one or more keywords bounded by "and," a command word, or an end of query signal. Thus, in the example, the query consists of three terms, OCEANOGRAPHIC or DESALINIZATION, START = 1967 or START = 1968, and NEW YORK STATE. These terms are so identified and entered into the term array along with the addresses in the keyword array at which the term starts and ends, as well as the summed frequency count of the keywords which make up the term.

Figure 11:
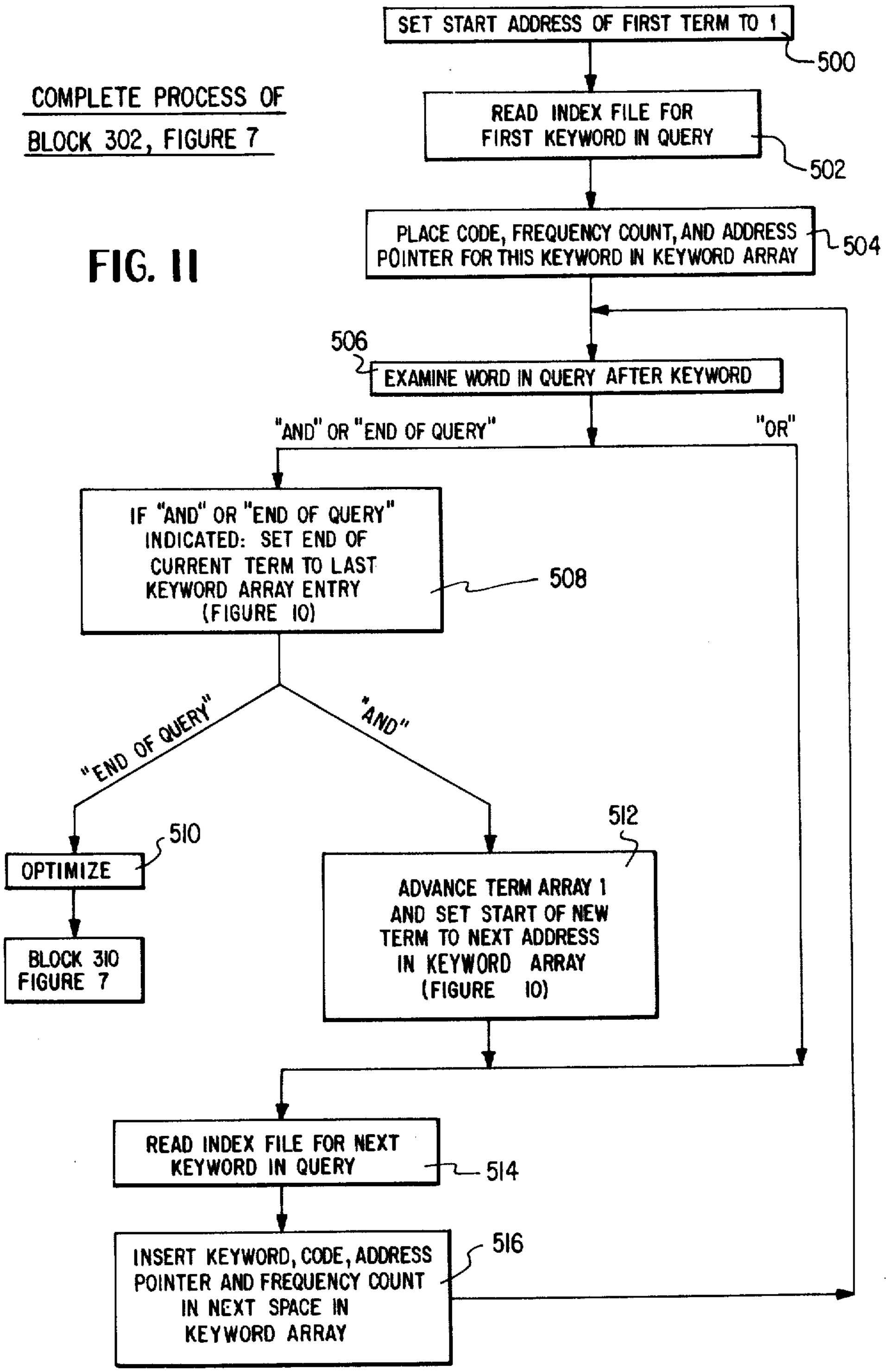
FIG. 11 is a flow chart for the keyword compiling process.

The development of the keyword and term arrays is called compiling the keyword description and will be described with reference to FIG. 11. It should be noted that the arrays are formed in temporary storage locations in the computer. The start address for the first keyword of the first term is set to 1 (block 500), and the record of this first keyword read from the index file (block 502). The record for this keyword consisting of its code, frequency count and address pointer is read into the keyword array (block 504). The next word in the query is then scanned to determine if the keyword just read was the last keyword in the term. If it was not, then the record in the index file which contains the next keyword is read and inserted in the keyword array at the next storage location. This is indicated in FIG. 9 where the first keyword and its record is stored at address 1 and the next keyword in the term, DESALINIZATION, is stored in address 2. This process continues until all the keywords in a term are recorded in the keyword array.

If, however, the next word after a keyword in a query is an "and" or an indication of the end of the query, the end of the term has been reached. The keyword array address of this last keyword is written into the term array and the frequency count of all the keywords in the term summed and recorded in the term array (block 508). The term array contains only the start and end address for each term and the summed frequency count.

If this term was not the last term in the query, then the address in the term array is advanced 1 and the start address set to the keyword array address of the first keyword in the next term (block 512). The record in the index file of this next keyword is now read and written into the keyword array.

By way of example, assume that the keyword DESALINIZATION is read and its record written into the keyword array. The word following desalinization is "and" thereby signaling the end of a term. Therefore, the term array is advanced 1 and the keyword array address 3 indicating the keyword array address of the keyword START = 1967 is written into the term array. Since the word after START = 1967 is "or" the record in the index file corresponding to the keyword occurring after START = 1967 is read and transferred into the keyword array. In this case, the word is START = 1968. The word after START = 1968 is "and" thereby indicating the end of term. Therefore, the end address in the term array is set to 4 and the array advanced by 1. The next keyword, NEW YORK STATE, is a term unto itself. Therefore, its start and end address in the term array is the same, 5.

Additionally, since a period is indicated after the term NEW YORK STATE, indicating the end of the query, the terms are then optimized, i.e., the term array is scanned to determine which term occurs the least number of times. In the case of FIG. 10, the term OCEANOGRAPHIC or DESALINIZATION occurs the least number of times, specifically eight. Therefore, searching will be on this term.

Once the term on which searching is to take place is determined, the highest address pointer in that term is found. In the case of the term OCEANOGRAPHIC or DESALINIZATION, this address is 100 and is associated with the keyword OCEANOGRAPHIC (block 304). This pointer is used to address the search file record at address location 100. In this manner, the search file is addressed and the record determined by the address pointer read. Each coded keyword in the query as listed in the keyword array is compared with the coded keywords in the search and overflow records. If a keyword in the record corresponds to a keyword in the minimum term, then its link address is transferred to the keyword array.

For every term in the query, the program requires that a check be made to determine if at least one keyword array entry for each term is present in the search record. For those that are, a flag is set in the keyword array to indicate the keyword is present in the record. If any term does not have at least one keyword in the addressed record or if the flag in the search record designated the item as deleted, then the conditions of the query are not met and the process continues at block 310.

The keyword array is scanned between the start and end addresses in the keyword array of the minimum term to locate the next highest address pointer. If this address pointer is 0, then the search is ended. If it is not 0, then the record is read (block 312). Again, the keyword in the record is compared with the keywords in the query and a determination is made if the query conditions are met and whether the record has been deleted. If it is and the record has not been deleted the data record is read from the data file (block 308) and the data read out. The data record, when read, may be printed out or read by any known means, such as CRT, paper prints, etc. In addition, the item numbers may be saved in a core array as an input to the change fields or enter and remove keywords procedures.

The current position in all chains being searched is maintained in the keyword array as disclosed above. Thus searching may be interrupted at any time and then resumed by entering the search process at block 310 using the same keyword array as previously used. If the item numbers are being saved in core, then when the available space in the core array is exhausted, searching is interrupted and the maintenance procedures (change fields, enter and remove keywords, etc.) are performed. Once all items in the array have been processed, searching is continued until either the array is filled again or until the search is ended.

To tie the above procedures together one example of a driving program which can be used with the invention is given. The following discussion is not a part of the invention but shows how the invention is combined into a file management system and how the system is commanded by a user to perform the operations of adding items, replacing field values, adding and removing keywords and searching. It is obvious to those skilled in the art that other driving programs can be used using different command languages.

Figure 17:
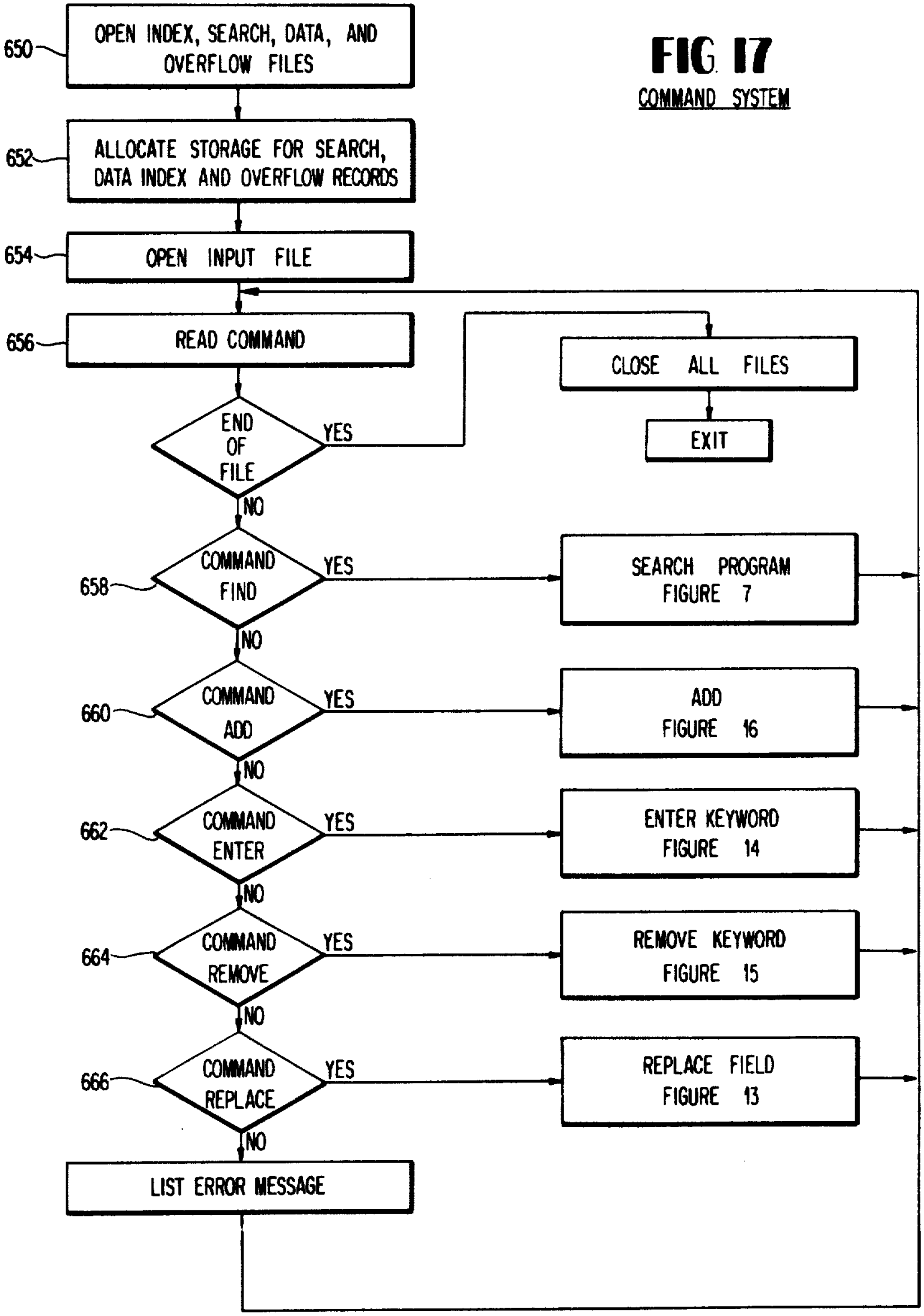
FIG. 17 is a flow chart of a command system usable with the system described herein.

The following discussion refers to FIG. 17. In a manner known in the art, the operating system initially opens the index, search data and overflow files (block 650). Storage space is allocated for the records in each file (block 652).

The space allocated to the records in each file is determined from the record lengths of the files. The keyword length is computed from the index file record length. Core storage used for keywords in the process of adding items, replacing keyed fields, entering, and removing keywords is allocated based upon this computed keyword length. The input file from which commands are read is opened. This file may be inputs from cards or from a remote terminal. The operating system is then instructed to read the input file (block 656). Depending upon the command read from the input file the program will begin to carry out one of the procedures disclosed herein.

A command takes the form of one or more cards or lines on a terminal which specify the operation to be performed and the data to be used by the operation. As an example, if a command is on cards, the first eight columns may be used to specify the operation to be performed, such as adding an item or searching, with columns 10 through 72 containing data.

Examples of specific command words which may be used to call different operations are as follows. The command for adding items can be the word ADD. The first card would then contain in the first eight columns the word ADD. The cards which follow would then contain the data item which is to be added to the system along with the keyword card which lists the external keywords associated with the data item being added.

The command for searching may be the word FIND. The data associated with this operation consists of keywords and connecting words which are interpreted as disclosed in the description of the searching procedure.

The command for changing fields may be the word REPLACE. The data stored on subsequent cards after the first command card consists of the item number, which can be used to identify the search record address there being a one to one correspondence between the data item number and the search record address, and the field value being entered.

The commands for adding and removing keywords from files may be ENTER and REMOVE respectively. The data then consists of the item number and the new keyword.

When the operating system reads a command it is compared against a list of command words (blocks 658 to 666). When the entered command matches a command stored in the list of command words the driving program calls the appropriate program and the specified operation is begun.

While the invention has been particularly shown and described with reference to a preferred embodiment thereof, it will be understood by those in the art that various changes in form and detail may be made therein without departing from the spirit and scope of the invention.

What is claimed is:

1. In a computer controlled information storage and retrieval system of the type including index, search and data files, a method for updating a data record comprising the steps of:

a. providing a data file storing data records identified by keywords, said data records including field values, b. providing an index file storing said keywords, each keyword being stored in an index record, each index record also containing the keyword in coded form, an address pointer and a frequency count of the number of search records which contain the keyword, said index file further including a trailer record containing the next available keyword code, c. providing a search file storing groups of keywords, each group termed a search record, there being a one-to-one correspondence between search records and data records in the data file, an index record being logically connected to said search file by an address pointer, common keywords in the search file being logically connected by link addresses, d. changing at least one file value in a data record, e. determining if the changed field value is also a keyword, and f. automatically updating the search and index files to reflect the changed field value if said field value is a keyword.

2. The computer controlled information storage and retrieval system of claim 1 wherein said step of determining includes providing table means for storing fields and an indication for each field stored of its status as a keyword and scanning said table to determine if a field is a keyword.

3. The computer controlled information storage and retrieval system of claim 2 wherein said step of automatically updating includes:

adding a new keyword to the search record corresponding to the data record being changed, modifying the chain of link addresses associated with the new keyword to include said search record, deleting the keyword in said search record corresponding to the field value being deleted, and modifying the chain of link addresses associated with said deleted keyword to delete said search record address from the deleted keyword associated chain of link addresses.

4. In the computer controlled information storage and retrieval system of claim 1 said step automatically updating includes the step of removing a keyword from a selected search record comprising the steps of:

a. scanning said index file for said keyword;

b. scanning said search file for said selected search record;

c. writing the selected index record corresponding to the keyword to be removed in core storage;

d. writing the selected search record in core storage;

e. extracting the link address in said selected search record corresponding to the keyword to be removed and storing it in core storage;
f. bypassing said selected search record by inserting the link address corresponding to the keyword to be removed into the search record whose link address, corresponding to the keyword to be removed, points to said selected search record;
g. decrementing the frequency count in the selected index record by one;
h. comparing the frequency count to zero;
i. rewriting the selected index record in the index file if the frequency count is other than zero;
j. removing said selected keyword from said selected search record; and
k. rewriting said selected search record in said search file.

5. The method of claim 4 wherein the step of bypassing said selected search record includes the step of comparing the address of said selected search record with the address pointer associated with said selected index record to determine if they are equal.

6. The method of claim 5 when said step of comparing said address pointer with said address of said selected search record indicates that the address of said selected search record is equal to the address pointer, further comprising the step of:

changing said address pointer to indicate the address of said selected search record.

7. The method of claim 5, when said step of comparing said address pointer with said address of said selected search record indicates that the address represented by said selected search record is not equal to said address pointer, further comprising the steps of:

a. reading each search record specified by the link addresses associated with the selected keyword;
b. comparing the selected keyword associated link addresses with the selected search record address to determine equality each time a search record is read;
c. writing the search record which contains the link address corresponding to the selected search record in core storage;
d. rewriting the link address to correspond to said extracted link address, to update the search record; and
e. rewriting the updated search record in the search file.

8. In the computer controlled information storage and retrieval system of claim 1 said step of automatically updating includes the step of adding a selected keyword to a selected search record when said keyword has been previously stored in said index file comprising the steps of:

a. scanning said index file for said selected keyword;
b. reading out and storing in core storage said selected keyword index record;
c. extracting the address pointer from said read out index record and storing it in core storage; and
d. updating said search file and index file to incorporate said selected keyword in said selected search file and to incorporate said selected search record in a search on said selected keyword.

9. The method of claim 8 wherein said step of updating includes the step of comparing the address of said selected search record with said address pointer to determine which indicates a higher search file address.

10. The method of claim 9, when said selected search record address is higher than the address indicated by said address pointer, further comprising the steps of:

a. reading out and storing in core storage said selected search record;
b. writing said selected keyword in said selected search record;
c. writing a link address corresponding to the selected keyword and equal to said address pointer in said selected search record;
d. rewriting said selected search record in the search file;
e. deleting said address pointer from said selected index record;
f. rewriting said address pointer setting it equal to the address of said selected search record; and
g. rewriting said selected index record in the index file.

11. The method of claim 9, when said selected search record address is not higher than the address indicated by said address pointer, further comprising the steps of:

a. reading each search record specified by the link addresses associated with the selected keyword;
b. comparing, each time a search record is read, the selected keyword associated link address with the selected search record address to determine which indicates a higher search file address;
c. writing said selected search record in core storage when the first search record containing a selected keyword associated link address lower than the address of said selected search record is found;
d. writing said selected keyword in said selected search record;
e. writing a selected keyword associated link address equal to the link address in said first search record in said selected search record;
f. rewriting said selected search record in the search file;
g. writing said first search record in core storage;
h. deleting from said first search record said selected keyword associated link address;
i. writing a selected keyword associated link address equal to the address of said selected search record in said first search record; and
j. rewriting said first search record in the search file.

12. In the computer controlled information storage and retrieval system of claim 1 said step of automatically updating includes the step of adding a selected keyword to a selected search record when said keyword has not been previously stored in the index file comprising the steps of:

a. reading said trailer record to determine the next sequential code to be assigned a newly entered keyword;
b. writing said keyword and said next code in core storage;
c. adding an address pointer to said keyword in core storage corresponding to the address of said selected search record to form an index record;
d. writing said selected search record in core storage;
e. writing said next code in said selected search record;
f. writing a selected keyword associated link address of zero in said selected search record;
g. writing said selected search record in the search file; and
h. writing said index record in the index file.

13. In a computer controlled information storage and retrieval system of the type including a data file for storing data items, an index file for storing keywords which identify the data items and a search file for storing groups of keywords, each group being termed a search record and corresponding to only one data record, a method for updating the system comprising:

a. adding a single data record to said data file,
b. writing the keywords associated with said added data record in core storage,
c. writing in core storage, for each keyword, its link address,
d. writing the keywords and their link addresses on the search file to form a search record,
e. writing in core storage each keyword in the new search record not previously stored in the index file, and
f. writing said keywords not previously stored in said index file on said index file.

14. In a computer controlled information storage and retrieval system of the type including data, search and index files, a method for adding a single data record to the data file while updating the search and index files to reflect the added data record, comprising:

a. providing a data file storing data records identified by keywords, b. providing an index file storing keywords, each keyword being stored in an index record, each index record also comprising its keyword in coded form, said index file further including a trailer record indicating a next available code assignable to a keyword.
c. providing a search file storing groups of coded keywords, said groups of keywords termed search records, there being a one-to-one correspondence between the search records and data records, each of said index records containing an address pointer to logically connect said each index record to one search record containing the keyword defined by the index record, common keywords in the search file being logically connected by a link address,
d. writing said single data record in core storage,
e. extracting keywords from said data item,
f. writing said data record in the data file,
g. writing a search record corresponding to said added data record in core storage and updating the index file to reflect the keywords in the keywords in said corresponding search record, and
h. writing said corresponding search record in said file.

15. The method of claim 14 wherein said step of writing said corresponding search record includes the step of scanning the index file for said extracted keywords to determine if all extracted keywords are in the index file.

16. The method of claim 15, when at least one of the extracted keywords is not in the indexed file, the step of writing the search record in core storage comprising, for each keyword not in the index file, the further steps of:
a. reading said trailer record to determine the next available code;
b. assigning said code in core storage to the extracted keyword not in the index file;
c. assigning in core storage an address pointer indicating the address of said corresponding search record to said extracted keyword not in the index file;
d. updating said trailer record to indicate the next available code;
e. writing said code for said keyword in said corresponding search record;
f. writing a link address corresponding to said extracted keyword not in the index file equal to zero in said corresponding search record;
g. rewriting said corresponding search record in said search file; and
h. writing said extracted keyword, its code and address pointer into the index file.

17. The method of claim 15, when at least one of said extracted keywords is in said index file, the step of writing the search record in core, comprising for each extracted keyword in said index file the further steps of:
a. reading the index file for the index record corresponding to said each extracted keyword in the index file;
b. determining the code and address pointer corresponding to said each extracted keyword;
c assigning in core storage said corresponding code to said each extracted keyword;
d. assigning in core storage said corresponding address pointer to said each extracted keyword;
e. writing said corresponding index record in core storage;
f. deleting the address pointer in said corresponding index record;
g. inserting an address pointer corresponding to the address of said corresponding search record in said corresponding index record; and
h. writing said extracted keyword, its code and address pointer into the index file.

18. In a computer controlled information storage and retrieval system of the type comprising three files termed the index, search and data files, said index file containing a plurality of keywords, said search file containing a plurality of search records, each comprising a group of keywords in coded form, and said data file containing a plurality of data records, said data records including field values, there being a one-to-one correspondence between the data records and the search file records, a method for deriving keywords directly from data field values in said data records comprising the steps of:
a. building a table in core storage containing all fields used in the data records;
b. adding a key flag to each field which is to be a keyword to denote that the field value in each data record corresponding to the field is to be a keyword;
c. constructing a data record in core storage;
d. scanning said table for all field values which are to be made keywords; and
e. extracting from the data record those field values to be made keywords.

19. The method of claim 18 further comprising the steps of:
a. storing said extracted keywords in core storage;
b. assigning to each keyword the data file and search file addresses of said item which said keyword is used to at least partially identify;
c. assigning a code to each keyword; and
d. writing each keyword along with its code and its highest search file address into said index file.

20. In an information storage and retrieval system comprising an index, search and data file said index file containing a plurality of keywords, each of said keywords containing an address pointer to an address in said search file, said search file containing said plurality of keywords grouped to form unique search records, each keyword in said group of keywords containing a link address of another search record containing the same keyword and said data file containing a plurality of data records wherein there is a one-to-one correspondence between the data records and the records in said search file, a method for retrieving information stored in said data file which allows for the selective stopping and restarting of a search, through the search file comprising the steps of:
a. reading a query into the system and breaking it into words;
b. compiling the keywords contained in said query into an array including with each keyword its address pointer as well as the number of said groups of keywords in which it can be found, said number being its frequency count;
c. grouping the keywords in said query into terms, each term being one or more keywords separated in the query by the word and;
d. determining which keyword term has the minimum summed frequency count;
e. locating the highest address pointer in said keyword term with the minimum summed frequency count,
f. reading said search record identified by said highest address pointer;
g. comparing all keywords in said query with all keywords in said read search record;
h. reading the data record in said data file when said keywords in said read search record corresponds to said query;
i. updating the highest address pointer to indicate the link address in the search record read;
j. stopping the search process, to carry out some other operation; and
k. restarting said search process at the point left off by restarting the search at the search record indicated by the link address previously stored in the array of keywords.

21. In a computer controlled information storage and retrieval system of the type including index, search and data files, a method for allocating storage space in core storage comprising:
a. providing a data file storing data records,
b. providing an index file storing keywords which identify the data records, each keyword having associated therewith at least a coded keyword and an address pointer, said keyword and its associated information being termed an index record, c. providing a search file storing groups of keywords, each group termed a search record, each search record corresponding to only one data record, common keywords in said search file being logically connected by link addresses, d. entering into the system the maximum allowable keyword length, e. computing the index record length from said keyword length, f. computing the maximum allowable keyword length from said computed index record length, and g. allocating keyword storage space in core storage on the basis of the computed keyword length.

22. In a computer controlled information storage and retrieval system of the type including index, search and data files, a method for deleting data records from a search operation comprising:

a. providing a data file storing data records, b. providing an index file storing keywords which identify the data items, c. providing a search file storing groups of keywords, said groups of keywords termed search records, there being a one-to-one correspondence between said search records and said data records, common keywords in said search file being logically connected by link addresses, d. designating with a flag and not deleting those search records corresponding to the data records to be deleted from a search operation, and e. bypassing, during a search, all search records containing said flag.

* * * * *